United States Patent
Tomioka

(10) Patent No.: US 12,158,561 B2
(45) Date of Patent: *Dec. 3, 2024

(54) IMAGING LENS AND IMAGING APPARATUS

(71) Applicant: FUJIFILM Corporation, Tokyo (JP)

(72) Inventor: Ryoko Tomioka, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/420,911

(22) Filed: Jan. 24, 2024

(65) Prior Publication Data

US 2024/0168260 A1    May 23, 2024

Related U.S. Application Data

(63) Continuation of application No. 17/235,079, filed on Apr. 20, 2021.

(30) Foreign Application Priority Data

Apr. 23, 2020  (JP) .................................. 2020-076929

(51) Int. Cl.
 *G02B 13/00*   (2006.01)
 *G02B 9/12*    (2006.01)

(52) U.S. Cl.
 CPC ........... *G02B 13/0035* (2013.01); *G02B 9/12* (2013.01)

(58) Field of Classification Search
 CPC ............................... G02B 13/0035; G02B 9/12
 See application file for complete search history.

(56) References Cited

U.S. PATENT DOCUMENTS

| | | |
|---|---|---|
| 2009/0251795 A1 | 10/2009 | Adachi et al. |
| 2012/0140327 A1 | 6/2012 | Abe et al. |
| 2012/0194924 A1 | 8/2012 | Sakai et al. |
| 2015/0092100 A1* | 4/2015 | Chen ...................... G02B 13/16 348/349 |
| 2015/0248016 A1 | 9/2015 | Sakai |
| 2016/0139386 A1 | 5/2016 | Morooka |

(Continued)

FOREIGN PATENT DOCUMENTS

| | | |
|---|---|---|
| JP | 2000-284171 A | 10/2000 |
| JP | 2001-033697 A | 2/2001 |

(Continued)

OTHER PUBLICATIONS

An Office Action; "Notice of Reasons for Refusal," mailed by the Japanese Patent Office on Jul. 25, 2023, which corresponds to Japanese Patent Application No. 2020-076929 and is related to U.S. Appl. No. 17/235,079; with English language translation.

(Continued)

*Primary Examiner* — Alicia M Harrington
(74) *Attorney, Agent, or Firm* — Studebaker & Brackett PC

(57) ABSTRACT

An imaging lens consists of, in order from the object side to the image side, a first lens group having a positive refractive power, a second lens group having a negative refractive power, and a third lens group. During focusing, only the second lens group moves. The imaging lens satisfies a conditional expression: $-0.5<f/f3<0.38$ regarding the focal length f of the imaging lens and the focal length f3 of the third lens group in a state where an object at infinity is in focus.

11 Claims, 25 Drawing Sheets

EXAMPLE 1

(56) References Cited

U.S. PATENT DOCUMENTS

2016/0291290 A1  10/2016  Omori
2019/0004286 A1  1/2019   Heu et al.
2019/0079268 A1  3/2019   Suzuki
2019/0302432 A1  10/2019  Iwasawa et al.

FOREIGN PATENT DOCUMENTS

| | | |
|---|---|---|
| JP | 2009-251432 A | 10/2009 |
| JP | 2009-265657 A | 11/2009 |
| JP | 2012-118431 A | 6/2012 |
| JP | 2012-155223 A | 8/2012 |
| JP | 2012-159613 A | 8/2012 |
| JP | 2014-021341 A | 2/2014 |
| JP | 2015-041012 A | 3/2015 |
| JP | 2015-163928 A | 9/2015 |
| JP | 2016-006469 A | 1/2016 |
| JP | 2016-099362 A | 5/2016 |
| JP | 2016-180896 A | 10/2016 |
| JP | 2019-053153 A | 4/2019 |
| JP | 2019-179082 A | 10/2019 |

OTHER PUBLICATIONS

An Office Action; "Notice of Reasons for Refusal," mailed by the Japanese Patent Office on May 9, 2023, which corresponds to Japanese Patent Application No. 2020-076929 and is related to U.S. Appl. No. 17/235,079; with English language translation.

An Office Action; "Notice of Reasons for Refusal," mailed by the Japanese Patent Office on Jun. 4, 2024, which corresponds to Japanese Patent Application No. 2023-184041 and is related to U.S. Appl. No. 18/420,911; with English language translation.

\* cited by examiner

EXAMPLE 1

EXAMPLE 2

EXAMPLE 3

EXAMPLE 4

EXAMPLE 5

EXAMPLE 8

EXAMPLE 9

EXAMPLE 10

EXAMPLE 11

IMAGING LENS AND IMAGING APPARATUS

CROSS-REFERENCE TO RELATED APPLICATIONS

The present application is a Continuation of U.S. patent application Ser. No. 17/235,079, filed on Apr. 20, 2021, which claims priority under 35 U.S.C. § 119 to Japanese Patent Application No. 2020-076929, filed on Apr. 23, 2020. The above application is hereby expressly incorporated by reference, in its entirety, into the present application.

BACKGROUND OF THE INVENTION

1. Field of the Invention

The present disclosure relates to an imaging lens and an imaging apparatus.

2. Description of the Related Art

Conventionally, as imaging lenses used in digital cameras and the like, the lens systems described in JP2012-159613A, JP2016-099362A, and JP2014-021341A are known.

SUMMARY OF THE INVENTION

In recent years, there has been a demand for an imaging lens which is configured to have a small size, has favorable optical performance, and is advantageous for achieving an increase in speed of focusing.

The present disclosure has been made in view of the above circumstances, and an object of the present disclosure is to provide an imaging lens which is configured to have a small size, has favorable optical performance, and is advantageous for achieving an increase in speed of focusing, and an imaging apparatus comprising the imaging lens.

The imaging lens of the present disclosure consists of, in order from an object side to an image side: a first lens group that has a positive refractive power; a second lens group that has a negative refractive power; and a third lens group. During focusing, the first lens group and the third lens group remains stationary with respect to an image plane, and the second lens group moves, and assuming that a focal length of the whole system in a state where an object at infinity is in focus is f, and a focal length of the third lens group is f3, Conditional Expression (1) is satisfied, which is represented by $$-0.5 < f/f3 < 0.38 \qquad (1).$$

It is preferable that the imaging lens of the present disclosure satisfies Conditional Expressions (1-1), which is represented by $$-0.4 < f/f3 < 0.3 \qquad (1\text{-}1).$$

It is preferable that the first lens group includes, successively in order from a position closest to the object side to the image side, a first lens that has a negative refractive power, and a second lens that has a positive refractive power. Assuming that a refractive index of the first lens at a d line is N1, and a refractive index of the second lens at the d line is N2, it is preferable that Conditional Expressions (2) and (3) are satisfied, which are represented by $$1.6 < N1 < 2.1 \qquad (2), \text{ and}$$

$$1.6 < N2 < 2.1 \qquad (3).$$

In addition, while satisfying Conditional Expressions (2) and (3), it is more preferable that Conditional Expression (2-1) is satisfied, which is represented by $$1.65 < N1 < 2 \qquad (2\text{-}1).$$

In a configuration in which the first lens group includes the first lens and the second lens, assuming that an Abbe number of the first lens based on the d line is v1n, and an Abbe number of the second lens based on the d line is v1p, it is preferable that Conditional Expression (4) is satisfied, which is represented by $$5 < v1n - v1p < 40 \qquad (4).$$

It is preferable that the first lens group includes a stop. It is preferable that the first lens group includes, successively in order from a position closest to the object side to the image side, a first lens that has a negative refractive power, a second lens that has a positive refractive power, and a stop.

In a case where one lens component is one single lens or one group of cemented lenses, a lens component closest to the image side in the third lens group may have a negative refractive power.

A lens surface closest to the image side in the third lens group may be a concave surface.

It is preferable that the second lens group consists of one single lens or one group of cemented lenses.

Assuming that a focal length of the second lens group is f2, it is preferable that Conditional Expression (5) is satisfied, which is represented by $$0.5 < |f/f2| < 2 \qquad (5).$$

In a configuration in which the second lens group consists of one single lens and the third lens group consists of one positive lens and one negative lens, assuming that an Abbe number of the positive lens of the third lens group based on a d line is v3p, and an Abbe number of the negative lens of the third lens group based on the d line is v3n, it is preferable that Conditional Expression (6) is satisfied, which is represented by $$5 < v3n - v3p < 38 \qquad (6).$$

In a configuration in which the second lens group consists of one positive lens and one negative lens, and the third lens group consists of one positive lens and one negative lens, assuming that an Abbe number of the positive lens of the second lens group based on a d line is v2p, an Abbe number of the negative lens of the second lens group based on the d line is v2n, an Abbe number of the positive lens of the third lens group based on the d line is v3p, and an Abbe number of the negative lens of the third lens group based on the d line is v3n, it is preferable that Conditional Expressions (7) and (8) are satisfied, which are represented by $$8 < v2n - v2p < 35 \qquad (7), \text{ and}$$

$$15 < v3p - v3n < 45 \qquad (8).$$

It is preferable that The first lens group includes a stop and at least one group of cemented lenses which is disposed on the image side of the stop and which includes a negative lens and a positive lens. Assuming that an Abbe number of the positive lens of the cemented lenses of the first lens group based on a d line is v1cp, it is preferable that the imaging lens includes at least one positive lens satisfying Conditional Expression (9), which is represented by $$70 < v1cp < 110 \qquad (9).$$

Assuming that Abbe numbers of the positive lenses and the negative lenses of the cemented lenses of the first lens group, which are cemented to each other, based on the d line are v1cp and v1cn, it is preferable that the imaging lens includes at least one group of cemented lenses satisfying Conditional Expression (10), which is represented by $$50<v1cp-v1cn<85 \qquad (10).$$

Assuming that a radius of curvature of a lens surface closest to the object side in the second lens group is R2f, and a radius of curvature of a lens surface closest to the image side in the second lens group is R2r, it is preferable that Conditional Expression (11) is satisfied, which is represented by $$-4<(R2r+R2f)/(R2r-R2f)<-0.5 \qquad (11).$$

Assuming that a radius of curvature of a lens surface closest to the object side in the third lens group is R3f, and a radius of curvature of a lens surface closest to the image side in the third lens group is R3r, it is preferable that Conditional Expression (12) is satisfied, which is represented by $$-10<(R3r+R3f)/(R3r-R3f)<10 \qquad (12).$$

Assuming that a lateral magnification of the second lens group in the state where the object at infinity is in focus is β2, and a lateral magnification of the third lens group in the state where the object at infinity is in focus is β3, it is preferable that Conditional Expression (13) is satisfied, which is represented by $$-7.5<(1-\beta 2^2)\times \beta 3^2<-4 \qquad (13).$$

Assuming that a focal length of the first lens group is f1, and a distance on an optical axis from a reference to an image side principal point of the first lens group in a case where the reference is a lens surface closest to the image side in the first lens group is dH, and a sign of a distance on the object side from the reference is negative and a sign of a distance on the image side from the reference is positive, with respect to dH, it is preferable that Conditional Expression (14) is satisfied, which is represented by $$0.3<dH/f1<0.7 \qquad (14).$$

An imaging apparatus according to another aspect of the present disclosure comprises the imaging lens according to the aspect of the present disclosure.

In the present specification, it should be noted that the terms "consisting of ~" and "consists of ~" mean that the lens may include not only the above-mentioned components but also lenses substantially having no refractive powers, optical elements, which are not lenses, such as a stop, a filter, and a cover glass, and mechanism parts such as a lens flange, a lens barrel, an imaging element, and a camera shaking correction mechanism.

It should be noted that, in the present specification, the term "~ group having a positive refractive power" means that the group has a positive refractive power as a whole. Similarly, the term "~ group having a negative refractive power" means that the group has a negative refractive power as a whole. The terms "a lens having a positive refractive power", "a positive lens", and "a lens with a positive power" are synonymous. The terms "a lens having a negative refractive power", "a negative lens", and "a lens with a negative power" are synonymous. The term "~ lens group" is not limited to a configuration consisting of a plurality of lenses, but may consist of only one lens. The term "whole system" means an imaging lens.

The term "single lens" means one uncemented lens. Here, a compound aspheric lens (a lens in which a spherical lens and an aspheric film formed on the spherical lens are integrally formed and function as one aspheric lens as a whole) is not regarded as cemented lenses, but the compound aspheric lens is regarded as a single lens. Unless otherwise specified, the sign of refractive power, the surface shape, and the radius of curvature of a lens including an aspheric surface are considered in terms of the paraxial region. Regarding the sign of the radius of curvature, the sign of the radius of curvature of the surface convex toward the object side is positive and the sign of the radius of curvature of the surface convex toward the image side is negative.

The "focal length" used in a conditional expression is a paraxial focal length. The values used in Conditional Expressions are values in a case where the d line is used as a reference in a state where the object at infinity is in focus. The "d line", "C line", "F line", and "g line" described in this specification are emission lines. In this specification, it is assumed that the d line wavelength is 587.56 nm (nanometers), the C line wavelength is 656.27 nm (nanometers), the F line wavelength is 486.13 nm (nanometers), and the g line wavelength is 435.84 nm (nanometers).

In the present disclosure, it is possible to provide an imaging lens which is configured to have a small size, has favorable optical performance, and is advantageous for achieving an increase in speed of focusing, and an imaging apparatus including the imaging lens.

DESCRIPTION OF THE PREFERRED EMBODIMENTS

Figure 1:
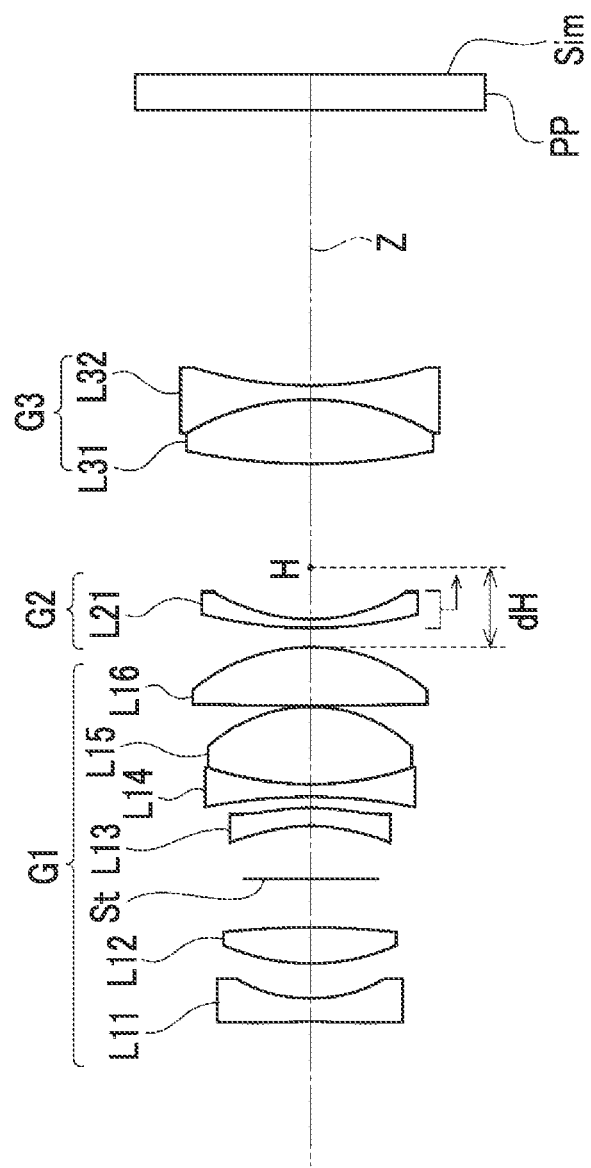
FIG. 1 is a cross-sectional view showing a configuration of an imaging lens according to an embodiment, which corresponds to the imaging lens of Example 1.
Figure 2:
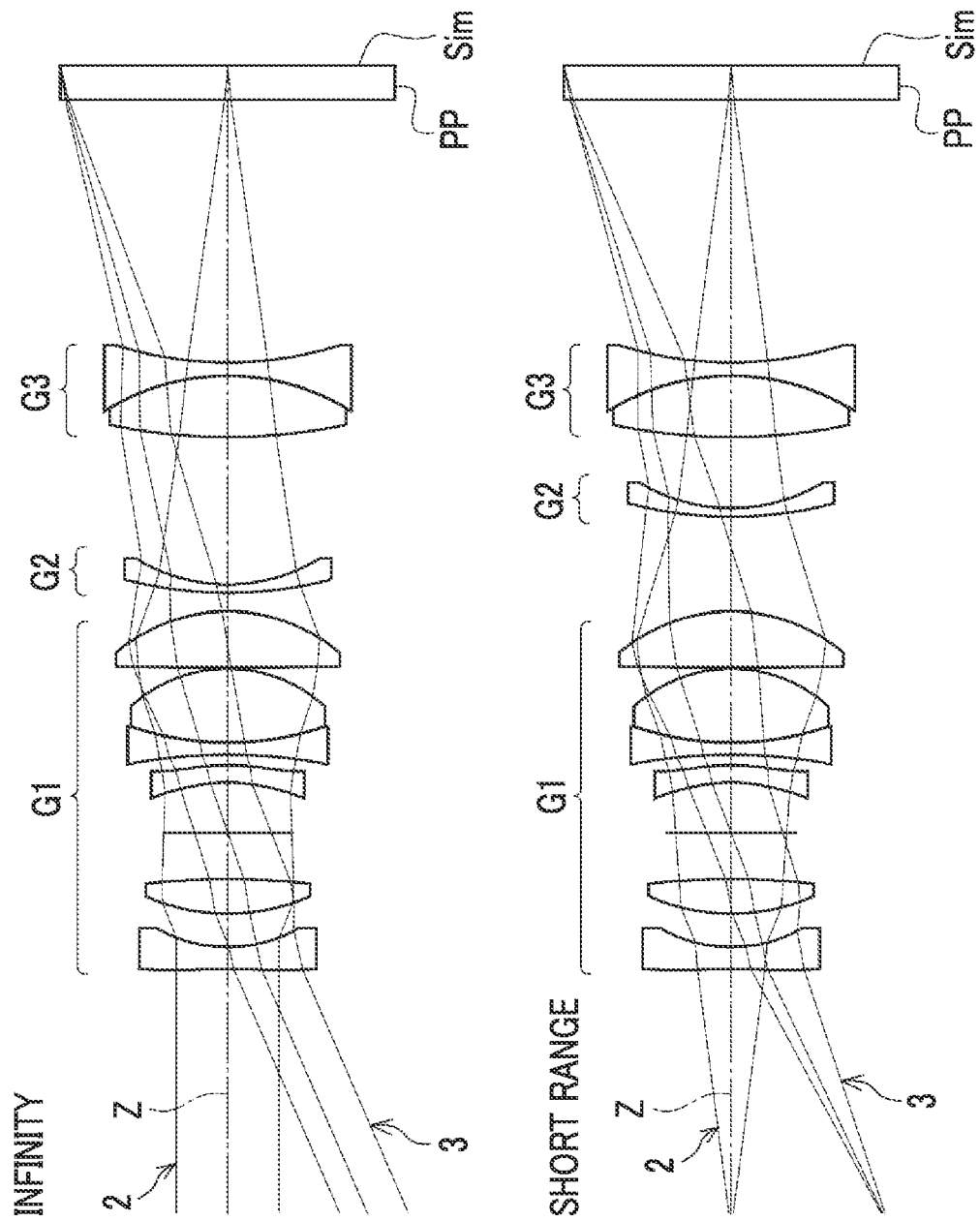
FIG. 2 is a cross-sectional view showing a configuration and rays in each in-focus state of the imaging lens of FIG. 1.

Hereinafter, embodiments of the present disclosure will be described in detail with reference to the accompanying drawings. FIG. 1 shows a cross-sectional view of the configuration of the imaging lens according to the embodiment of the present disclosure in a state where the object at infinity is in focus. FIG. 2 shows a cross-sectional view showing a configuration and rays in each in-focus state of the imaging lens. In FIG. 2, the upper part labeled "infinity" shows a state where an object at an object distance of infinity is in focus, and the lower part labeled "short range" shows a state where a short range object with an object distance of 21.8 mm (millimeters) is in focus. Hereinafter, an object at an object distance of infinity is referred to as the object at infinity. FIG. 2 shows, as the rays, on-axis rays 2 and rays with the maximum angle of view 3. The examples shown in FIGS. 1 and 2 correspond to the imaging lens of Example 1 described later. In FIGS. 1 and 2, the left side is the object side and the right side is the image side. Hereinafter, the imaging lens according to the embodiment of the present disclosure will be described mainly with reference to FIG. 1.

FIG. 1 shows an example in which, assuming that an imaging lens is applied to an imaging apparatus, an optical member PP having a parallel plate shape is disposed between the imaging lens and the image plane Sim. The optical member PP is a member assumed to include various filters, a cover glass, and/or the like. The various filters include, for example, a low pass filter, an infrared cut filter, and a filter that cuts a specific wavelength region. The optical member PP has no refractive power, and the optical member PP may be configured to be omitted.

The imaging lens consists of, in order from the object side to the image side along an optical axis Z, a first lens group G1 having a positive refractive power, a second lens group G2 having a negative refractive power, and a third lens group G3. By forming the lens group closest to the object side as a lens group having a positive refractive power, it is easy to achieve reduction in total length of the lens system. Thus, there is an advantage in achieving reduction in size.

As an example, the first lens group G1 of FIG. 1 consists of, in order from the object side to the image side, a negative lens L11, a positive lens L12, an aperture stop St, a negative lens L13, a negative lens L14, a positive lens L15, and a positive lens L16. Further, as an example, the second lens group G2 in FIG. 1 consists of only one lens of the lens L21, and the third lens group G3 in FIG. 1 consists of two lenses including a positive lens L31 and a negative lens L32 in order from the object side to the image side. In the example of FIG. 1, the lens L14 and the lens L15 are cemented to each other, and the lens L31 and the lens L32 are cemented to each other. The aperture stop St of FIG. 1 does not indicate the size and shape, but indicates the position in the optical axis direction.

The imaging lens is an inner-focus-type lens system in which only the second lens group G2 moves and the first lens group G1 and the third lens group G3 remain stationary with respect to the image plane Sim during focusing from the object at infinity to the closest object. Hereinafter, the lens group that moves during focusing is referred to as a focus group. The arrow pointing to the right below the second lens group G2 shown in FIG. 1 indicates that the second lens group G2 is a focus group and moves to the image side during focusing from the object at infinity to the closest object. By adopting the inner focus type, the total length of the lens system can be made constant regardless of the object distance during focusing. Even in a case of imaging a short range object, the total length of the lens system is the same as that in a case of imaging a long range object. Therefore, it is possible to reduce the possibility that the subject and the lens system interfere with each other in a case of imaging a short range object. Further, by adopting the inner focus type, it is easy to reduce the size and weight of the focus group. Thus, there is an advantage in achieving an increase in speed of focusing.

The imaging lens is configured so that, assuming that a focal length of the whole system in a state where an object at infinity is in focus is f and a focal length of the third lens group G3 is f3, Conditional Expression (1) is satisfied. By not allowing the corresponding value of Conditional Expression (1) to be equal to or less than the lower limit, the negative refractive power of the third lens group G3 does not become excessively strong. Therefore, the incident angle of the principal ray with the maximum angle of view on the image plane Sim can be suppressed from becoming large. By not allowing the corresponding value of Conditional Expression (1) to be equal to or greater than the upper limit, the positive refractive power of the third lens group G3 does not become excessively strong. Therefore, there is an advantage in suppressing field curvature, and there is an advantage in reducing in total length of the lens system. In order to obtain more favorable characteristics, it is preferable that the imaging lens satisfies Conditional Expression (1-1).

$$-0.5 < f/f3 < 0.38 \qquad (1)$$

$$-0.4 < f/f3 < 0.3 \qquad (1\text{-}1)$$

It is preferable that the first lens group G1 includes an aperture stop St. By disposing the aperture stop St in the first lens group, it is easy to reduce the outer diameter of the lens of the first lens group G1. As a result, there is an advantage in achieving reduction in size.

It is preferable that the first lens group G1 includes, successively in order from a position closest to the object side to the image side, a first lens that has a negative refractive power, a second lens that has a positive refractive power, and the aperture stop St. By limiting the number of lenses disposed on the object side of the aperture stop St to only two, it is easy to reduce the outer diameter of the lens on the object side of the aperture stop St. As a result, there is an advantage in achieving reduction in size. Further, by disposing both the negative lens and the positive lens on the object side of the aperture stop St, there is an advantage in correcting various aberrations. In the example of FIG. 1, the lens L11 corresponds to the first lens, and the lens L12 corresponds to the second lens.

In a case where the first lens group G1 includes the aperture stop St, it is preferable that the first lens group G1 comprises at least one group of cemented lenses which are disposed on the image side of the aperture stop St and which include a negative lens and a positive lens. In such a case, there is an advantage in correcting longitudinal chromatic aberration.

It is preferable that the second lens group G2 consists of one lens component. It should be noted that one lens component means one single lens or one group of cemented lenses. By adopting a configuration in which the focus group consists of one single lens or one group of cemented lenses, the weight of the focus group can be easily reduced. As a result, there is an advantage in achieving an increase in speed of focusing.

In a case where the second lens group G2 consists of one single lens, it is easier to reduce the weight of the focus group than that in a case where the second lens group G2 consists of one group of cemented lenses. Therefore, there is an advantage in achieving an increase in speed of focusing. In a case where the second lens group G2 consists of one group of cemented lenses formed by cementing one positive lens and one negative lens, there is an advantage in suppressing fluctuations in chromatic aberration during focusing.

It is preferable that the third lens group G3 consists of one positive lens and one negative lens. Compared with the case where the third lens group G3 consists of only a negative lens and the case where a third lens group G3 consists of only a positive lens, the third lens group G3 has both a negative lenses and a positive lens. Therefore, there is an advantage in correcting the lateral chromatic aberration.

It is preferable that the third lens group G3 consists of one lens component. In a case where the third lens group G3 consists of one group of cemented lenses formed by cementing one positive lens and one negative lens, there is an advantage in correcting lateral chromatic aberration. In a case where the third lens group G3 consists of one single lens, there is an advantage in achieving reduction in size.

The lens component closest to the image side in the third lens group G3 may be configured to have a negative refractive power. By disposing a lens component having a negative refractive power at a position closest to the image side in the third lens group G3, off-axis rays incident on the image plane Sim from the lens component closest to the image side can be emitted in a direction away from the optical axis Z. As a result, the diameter of the lens component closest to the image side can be reduced, and the mount, which is used in a case where the imaging lens is mounted on the imaging apparatus, can be easily configured so that the off-axis rays are not blocked.

A lens surface closest to the image side in the third lens group G3 may be configured to be a concave surface. In this case, as in the case where the lens component having a negative refractive power is disposed at a position closest to the image side in the third lens group G3, as a result, there is an advantage in reducing the diameter of the lens component closest to the image side in the third lens group G3 while preventing the mount from blocking rays.

Next, a preferable configuration relating to conditional expressions will be described. However, the conditional expressions that the imaging lens preferably satisfies are not limited to the conditional expressions described in the form of the expression, and the lower limit and the upper limit are selected from the preferable and more preferable conditional expressions. The conditional expressions may include all conditional expressions obtained through optional combinations.

In a configuration in which the first lens group G1 includes the first lens having a negative refractive power at a position closest to the object side, assuming that the refractive index of the first lens at the d line is N1, it is preferable that the imaging lens satisfies Conditional Expression (2). By not allowing the corresponding value of Conditional Expression (2) to be equal to or less than the lower limit, even in a case where a negative refractive power necessary for the first lens is provided, the absolute value of the radius of curvature of the first lens can be suppressed from becoming excessively small. As a result, there is an advantage in correcting field curvature. By not allowing the corresponding value of Conditional Expression (2) to be equal to or greater than the upper limit, a low dispersion material can be selected as the material of the first lens. Thus, there is an advantage in correcting chromatic aberration. In order to obtain more favorable characteristics, it is more preferable that the imaging lens satisfies Conditional Expression (2-1).

$$1.6 < N1 < 2.1 \tag{2}$$

$$1.65 < N1 < 2 \tag{2-1}$$

In a configuration in which a lens which is the second from the object side in the first lens group G1 is the second lens having a positive refractive power, in a case where the refractive index of the second lens at the d line is N2, it is preferable that the imaging lens satisfies Conditional Expression (3). By not allowing the corresponding value of Conditional Expression (3) to be equal to or less than the lower limit, the absolute value of the radius of curvature of the second lens can be prevented from becoming excessively small. As a result, it is easy to secure the thickness of the circumferential portion of the second lens. By not allowing the corresponding value of Conditional Expression (3) to be equal to or greater than the upper limit, a low dispersion material can be selected as the material of the second lens. Thus, there is an advantage in correcting chromatic aberration. In order to obtain more favorable characteristics, it is more preferable that the imaging lens satisfies Conditional Expression (3-1).

$$1.6 < N2 < 2.1 \tag{3}$$

$$1.8 < N2 < 2 \tag{3-1}$$

In a configuration in which the first lens group G1 includes a first lens having a negative refractive power and a second lens having a positive refractive power successively in order from the most object side to the image side, it is preferable that the imaging lens satisfies both Conditional Expressions (2) and (3). Further, it is more preferable that both Conditional Expressions (2) and (3) are satisfied, and then at least one of Conditional Expressions (2-1) or (3-1) is satisfied.

Further, in a configuration in which the first lens group G1 includes a first lens having a negative refractive power and a second lens having a positive refractive power successively in order from the most object side to the image side, it is preferable that the imaging lens satisfies Conditional Expression (4). In Conditional Expression (4), the Abbe number based on the d line of the first lens is ν1n, and the Abbe number based on the d line of the second lens is ν1p. By not allowing the corresponding value of Conditional Expression (4) to be equal to or less than the lower limit, it is easy to correct lateral chromatic aberration. By not allowing the corresponding value of Conditional Expression (4) to be equal to or greater than the upper limit, lateral chromatic aberration can be suppressed from being excessively corrected. In order to obtain more favorable characteristics, it is more preferable that the imaging lens satisfies Conditional Expression (4-1).

$$5<v1n-v1p<40 \tag{4}$$

$$6<v1n-v1p<35 \tag{4-1}$$

Assuming that a focal length of the whole system in the state where the object at infinity is in focus is f and a focal length of the second lens group G2 is f2, it is preferable that the imaging lens satisfies Conditional Expression (5). By not allowing the corresponding value of Conditional Expression (5) to be equal to or less than the lower limit, the refractive power of the second lens group G2 can be prevented from becoming excessively weak. Therefore, it is possible to reduce the amount of movement of the second lens group G2 during focusing. Thereby, there is an advantage in achieving reduction in total length of the lens system. By not allowing the corresponding value of Conditional Expression (5) to be equal to or greater than the upper limit, the refractive power of the second lens group G2 is prevented from becoming excessively strong. As a result, there is an advantage in suppressing fluctuation in aberration during focusing. In order to obtain more favorable characteristics, it is more preferable that the imaging lens satisfies Conditional Expression (5-1).

$$0.5<|f/f2|<2 \tag{5}$$

$$0.7<|f/f2|<1.6 \tag{5-1}$$

In a configuration in which the second lens group G2 consists of one single lens and the third lens group G3 consists of one positive lens and one negative lens, it is preferable that the imaging lens satisfies Conditional Expression (6). In Conditional Expression (6), the Abbe number of the positive lens of the third lens group G3 based on the d line is v3p, and the Abbe number of the negative lens of the third lens group G3 based on the d line is v3n. By satisfying Conditional Expression (6), there is an advantage in satisfactorily correcting lateral chromatic aberration. In order to obtain more favorable characteristics, it is more preferable that the imaging lens satisfies Conditional Expression (6-1).

$$5<v3n-v3p<38 \tag{6}$$

$$9<v3n-v3p<38 \tag{6-1}$$

In a configuration in which the second lens group G2 consists of one positive lens and one negative lens, and the third lens group G3 consists of one positive lens and one negative lens, it is preferable that the imaging lens satisfies Conditional Expressions (7) and (8). In Conditional Expressions (7) and (8), the Abbe number of the positive lens of the second lens group G2 based on the d line is v2p, the Abbe number of the negative lens of the second lens group G2 based on the d line is v2n, the Abbe number of the positive lens of the third lens group G3 based on the d line is v3p, and the Abbe number of the negative lens of the third lens group G3 based on the d line is v3n. By satisfying Conditional Expression (7), there is an advantage in suppressing fluctuation in chromatic aberration during focusing. By satisfying Conditional Expression (8), there is an advantage in satisfactorily correcting lateral chromatic aberration. In order to obtain more favorable characteristics, it is more preferable that the imaging lens satisfies both Conditional Expressions (7) and (8), and then satisfies at least one of Conditional Expressions (7-1) or (8-1).

$$8<v2n-v2p<35 \tag{7}$$

$$12<v2n-v2p<30 \tag{7-1}$$

$$15<v3p-v3n<45 \tag{8}$$

$$20<v3p-v3n<40 \tag{8-1}$$

In a configuration in which the first lens group G1 comprises the aperture stop St and at least one group of cemented lenses disposed on the image side of the aperture stop St and including a negative lens and a positive lens, it is preferable that the imaging lens includes at least one positive lens satisfying Conditional Expression (9). In Conditional Expression (9), the Abbe number of the positive lens of the cemented lens of the first lens group G1 based on the d line is v1cp. By satisfying Conditional Expression (9), there is an advantage in correcting chromatic aberration, and particularly there is an advantage in satisfactorily correcting longitudinal chromatic aberration. In order to obtain more favorable characteristics, it is preferable that the imaging lens includes at least one positive lens satisfying Conditional Expression (9-1).

$$70<v1cp<110 \tag{9}$$

$$75<v1cp<105 \tag{9-1}$$

In a configuration in which the first lens group G1 comprises the aperture stop St and at least one group of cemented lenses disposed on the image side of the aperture stop St and including a negative lens and a positive lens, it is preferable that the imaging lens includes at least one group of cemented lenses satisfying Conditional Expression (10). In Conditional Expression (10), Abbe numbers of the positive lenses and the negative lenses of the cemented lenses, which are cemented to each other, in the first lens group G1 disposed on the image side of the aperture stop St based on the d line are v1cp and v1cn. By satisfying Conditional Expression (10), there is an advantage in correcting chromatic aberration, and particularly there is an advantage in satisfactorily correcting longitudinal chromatic aberration. In order to obtain more favorable characteristics, it is preferable that the imaging lens includes at least one group of cemented lenses satisfying Conditional Expression (10-1).

$$50<v1cp-v1cn<85 \tag{10}$$

$$55<v1cp-v1cn<83 \tag{10-1}$$

Assuming that a radius of curvature of a lens surface closest to the object side in the second lens group G2 is R2f and a radius of curvature of a lens surface closest to the image side in the second lens group G2 is R2r, it is preferable that the imaging lens satisfies Conditional Expression (11). The conditional expression (11) is an expression relating to the shape factor of the second lens group G2. By not allowing the corresponding value of Conditional Expression (11) to be equal to or less than the lower limit, there is an advantage in suppressing fluctuation in spherical aberration during focusing. By not allowing the corresponding value of Conditional Expression (11) to be equal to or greater than the upper limit, there is an advantage in suppressing fluctuation in field curvature during focusing.

In order to obtain more favorable characteristics, it is more preferable that the imaging lens satisfies Conditional Expression (11-1).

$$-4<(R2r+R2f)/(R2r-R2f)<-0.5 \quad (11)$$

$$-3.5<(R2r+R2f)/(R2r-R2f)<-1 \quad (11\text{-}1)$$

Assuming that a radius of curvature of a lens surface closest to the object side in the third lens group G3 is R3f and a radius of curvature of a lens surface closest to the image side in the third lens group G3 is R3r, it is preferable that the imaging lens satisfies Conditional Expression (12). The conditional expression (12) is an expression relating to the shape factor of the third lens group G3. By not allowing the corresponding value of Conditional Expression (12) to be equal to or less than the lower limit, there is an advantage in satisfactorily correcting spherical aberration. By not allowing the corresponding value of Conditional Expression (12) to be equal to or greater than the upper limit, there is an advantage in satisfactorily correcting field curvature. In order to obtain more favorable characteristics, it is more preferable that the imaging lens satisfies Conditional Expression (12-1).

$$-10<(R3r+R3f)/(R3r-R3f)<10 \quad (12)$$

$$-6<(R3r+R3f)/(R3r-R3f)<1 \quad (12\text{-}1)$$

Assuming that a lateral magnification of the second lens group G2 in a state where the object at infinity is in focus is β2 and a lateral magnification of the third lens group G3 in the state where the object at infinity is in focus is β3, it is preferable that the imaging lens satisfies Conditional Expression (13). By not allowing the corresponding value of Conditional Expression (13) to be equal to or less than the lower limit, the amount of change in the image position per amount of movement of the second lens group G2, which is the focus group, in the optical axis direction can be prevented from becoming excessively large. By not allowing the corresponding value of Conditional Expression (13) to be equal to or greater than the upper limit, it is possible to reduce the amount of movement of the second lens group G2 during focusing. Therefore, there is an advantage in achieving reduction in total length of the lens system. In order to obtain more favorable characteristics, it is more preferable that the imaging lens satisfies Conditional Expression (13-1).

$$-7.5<(1-\beta2^2)\times\beta3^2<-4 \quad (13)$$

$$-6.5<(1-\beta2^2)\times\beta3^2<-4.5 \quad (13\text{-}1)$$

Assuming that a focal length of the first lens group G1 is f1, and a distance on an optical axis from a reference to an image side principal point of the first lens group G1 in a case where the reference is the lens surface closest to the image side in the first lens group G1 is dH, it is preferable that the imaging lens preferably satisfies Conditional Expression (14). Regarding the sign of dH, a sign of a distance on the object side from the reference is negative and a sign of a distance on the image side from the reference is positive. As an example, FIG. 1 shows the image side principal point H and dH of the first lens group G1. By not allowing the corresponding value of Conditional Expression (14) to be equal to or less than the lower limit, there is an advantage in suppressing fluctuation in field curvature during focusing. This is due to the circumstances described below. If the corresponding value of Conditional Expression (14) is equal to or less than the lower limit, the image side principal point H of the first lens group G1 is located closer to the object side. Therefore, the back focal length of the first lens group G1 is shorter. This means that the object point of the second lens group G2 is located closer to the object side. In order to keep the image point of the second lens group G2 constant, it is necessary to increase the refractive power of the second lens group G2. In a case where the refractive power of the second lens group G2, which is the focus group, becomes stronger, the aberration fluctuation during focusing becomes larger, and the field curvature during focusing becomes particularly larger.

By not allowing the corresponding value of Conditional Expression (14) to be equal to or greater than the upper limit, there is an advantage in suppressing an increase in diameter of the lens on the image side in the first lens group, and there is also an advantage in suppressing spherical aberration.

$$0.3<dH/f1<0.7 \quad (14)$$

$$0.35<dH/f1<0.65 \quad (14\text{-}1)$$

The example shown in FIG. 1 is an example, and various modifications can be made without departing from the scope of the technology of the present disclosure. For example, the number of lenses constituting each lens group may be different from the number shown in FIG. 1.

Each lens group can have the following configuration, for example. The first lens group G1 may be configured to consist of, in order from the object side to the image side, a biconcave lens, a biconvex lens, an aperture stop St, a negative meniscus lens having a surface concave toward the object side, a negative lens having a surface concave toward the image side, a biconvex lens, and a positive lens having a surface convex toward the image side.

The second lens group G2 may be configured to consist of a negative meniscus lens having a surface convex toward the object side. Alternatively, the second lens group G2 may be configured to consist of a cemented lens in which a biconvex lens and a biconcave lens are cemented in order from the object side.

The third lens group G3 may be configured to consist of a cemented lens in which a positive lens and a negative lens are cemented in order from the object side. Alternatively, the third lens group G3 may be configured to consist of a cemented lens in which a negative lens and a positive lens are cemented in order from the object side. Alternatively, the third lens group G3 may be configured to consist of a negative meniscus lens having a surface convex toward the object side.

The above-mentioned preferred configurations and available configurations including the configurations relating to the conditional expressions may be any combination, and it is preferable to optionally adopt the configurations in accordance with required specification. Next, examples of the imaging lens of the present disclosure will be described.

Example 1

FIG. 1 is a cross-sectional view showing a configuration of an imaging lens of Example 1, and an illustration method and a configuration thereof are as described above. Therefore, repeated description is partially omitted herein. The imaging lens of Example 1 consists of, in order from the object side to the image side, a first lens group G1 having a negative refractive power, a second lens group G2 having a positive refractive power, and a third lens group G3 having a negative refractive power. During focusing from the object at infinity to the closest object, only the second lens group G2 moves to the image side along the optical axis Z, and the first lens group G1 and the third lens group G3 remain stationary with respect to the image plane Sim. The first lens group G1 consists of six lenses L11 to L16 and an aperture stop St. The aperture stop St is disposed between the lens L12 and the lens L13. The second lens group G2 consists of only the lens L21. The third lens group G3 consists of two lenses L31 and L32. The outline of the imaging lens of Example 1 has been described above.

Regarding the imaging lens of Example 1, Table 1 shows basic lens data, Table 2 shows a specification and variable surface distances, and Table 3 shows aspheric surface coefficients. In Table 1, the column of Sn shows surface numbers. The surface closest to the object side is the first surface, and the surface numbers increase one by one toward the image side. The column of R shows radii of curvature of the respective surfaces. The column of D shows surface distances on the optical axis between the respective surfaces and the surfaces adjacent to the image side. The column of Nd shows refractive indices of the respective components at the d line. The column of vd shows Abbe numbers of the respective components based on the d line.

In Table 1, the sign of the radius of curvature of the surface convex toward the object side is positive and the sign of the radius of curvature of the surface convex toward the image side is negative. Table 1 also shows the aperture stop St and the optical member PP. In a place of a surface number of a surface corresponding to the aperture stop St, the surface number and a term of (St) are noted. A value at the bottom place of D in Table 1 indicates a distance between the image plane Sim and the surface closest to the image side in the table. In Table 1, the symbol DD[ ] is used for each variable surface distance that varies during focusing, and the object side surface number of the distance is given in [ ] and is noted in the column D.

Table 2 shows the focal length f, the F number FNo., the maximum total angle of view 2ω, and the variable surface distance. (°) in the place of 2ω indicates that the unit thereof is a degree. For the focal length and the maximum total angle of view, the values in the state in which the object at infinity is in focus are shown. For other items, the column labeled "Infinity" shows values in the state in which the object at infinity is in focus, and the column labeled "Short range" shows values in a state where a short range object with an object distance of 21.8 mm (millimeters) is in focus. The object distance is a distance on the optical axis from the object to the lens surface closest to the object side in the first lens group G1. The values shown in Table 2 are based on the d line.

In Table 1, the reference sign * is attached to surface numbers of aspheric surfaces, and numerical values of the paraxial radius of curvature are written into the column of the radius of curvature of the aspheric surface. In Table 3, the row of Sn shows surface numbers of the aspheric surfaces, and the rows of KA and Am (m=4, 6, 8, 10, 12, 14, 16) shows numerical values of the aspheric surface coefficients for each aspheric surface. The "E±n" (n: an integer) in numerical values of the aspheric surface coefficients of Table 3 indicates "×10^{±n}". KA and Am are the aspheric surface coefficients in the aspheric surface expression represented by the following expression.

$$Zd = C \times h^2 / \{1 + (1 - KA \times C^2 \times h^2)^{1/2}\} + \Sigma Am \times h^m$$

Here,

Zd is an aspheric surface depth (a length of a perpendicular from a point on an aspheric surface at height h to a plane that is perpendicular to the optical axis Z in contact with the vertex of the aspheric surface), h is a height (a distance from the optical axis Z to the lens surface), C is an inverse of the paraxial radius of curvature, KA and Am are aspheric surface coefficients, and Σ in the aspheric surface expression means the sum with respect to m.

In data of each table, a degree is used as a unit of an angle, and mm (millimeter) is used as a unit of a length, but appropriate different units may be used since the optical system can be used even in a case where the system is enlarged or reduced in proportion. Each of the following tables shows numerical values rounded off to predetermined decimal places.

TABLE 1

Example 1

| Sn | R | D | Nd | vd |
|---|---|---|---|---|
| *1 | −49.8900 | 1.84 | 1.88202 | 37.22 |
| *2 | 15.0845 | 2.75 | | |
| 3 | 17.5672 | 2.87 | 1.92286 | 18.90 |
| 4 | −65.6410 | 3.84 | | |
| 5(St) | ∞ | 4.20 | | |
| *6 | −13.1524 | 1.44 | 1.95150 | 29.83 |
| *7 | −16.3514 | 0.87 | | |
| 8 | −44.8434 | 1.00 | 1.95906 | 17.47 |
| 9 | 26.2592 | 6.14 | 1.49700 | 81.54 |
| 10 | −12.4075 | 0.10 | | |
| 11 | 523.8062 | 4.63 | 1.77250 | 49.60 |
| 12 | −15.0000 | DD[12] | | |
| 13 | 35.0371 | 0.70 | 2.00100 | 29.13 |
| 14 | 15.2214 | DD[14] | | |
| 15 | 49.4355 | 5.10 | 2.10420 | 17.02 |
| 16 | −20.0772 | 1.11 | 2.05090 | 26.94 |
| 17 | 32.4055 | 21.81 | | |
| 18 | ∞ | 2.85 | 1.51680 | 64.20 |
| 19 | ∞ | 0.00 | | |

TABLE 2

Example 1

| | Infinity | Short range |
|---|---|---|
| f | 30.85 | — |
| FNo. | 3.51 | 3.83 |
| 2ω(°) | 47.8 | — |
| DD[12] | 1.50 | 7.83 |
| DD[14] | 12.24 | 5.91 |

TABLE 3

Example 1

| Sn | 1 | 2 | 6 | 7 |
|---|---|---|---|---|
| KA | 1.0000000E+00 | 1.0000000E+00 | 1.0000000E+00 | 1.0000000E+00 |
| A4 | 4.8700186E−04 | 4.9566970E−04 | 3.4285346E−04 | 5.0356942E−04 |
| A6 | −1.2524039E−05 | −1.0689265E−05 | −7.5942044E−07 | 8.3054269E−07 |

TABLE 3-continued

| | Example 1 | | | |
|---|---|---|---|---|
| Sn | 1 | 2 | 6 | 7 |
| A8 | 2.2144266E−07 | 6.2146808E−08 | −8.4110416E−09 | 1.1393320E−08 |
| A10 | −1.6569463E−09 | 2.9213132E−09 | −2.4656423E−09 | −2.1888758E−09 |
| A12 | −2.9686322E−11 | −4.5072031E−11 | 2.5392972E−11 | 1.8267956E−11 |
| A14 | 8.0926214E−13 | −1.1534979E−12 | 1.3130562E−13 | 1.4751413E−13 |
| A16 | −5.4871611E−15 | 2.4153504E−14 | −5.3654000E−16 | −8.6852042E−19 |

Figure 3:
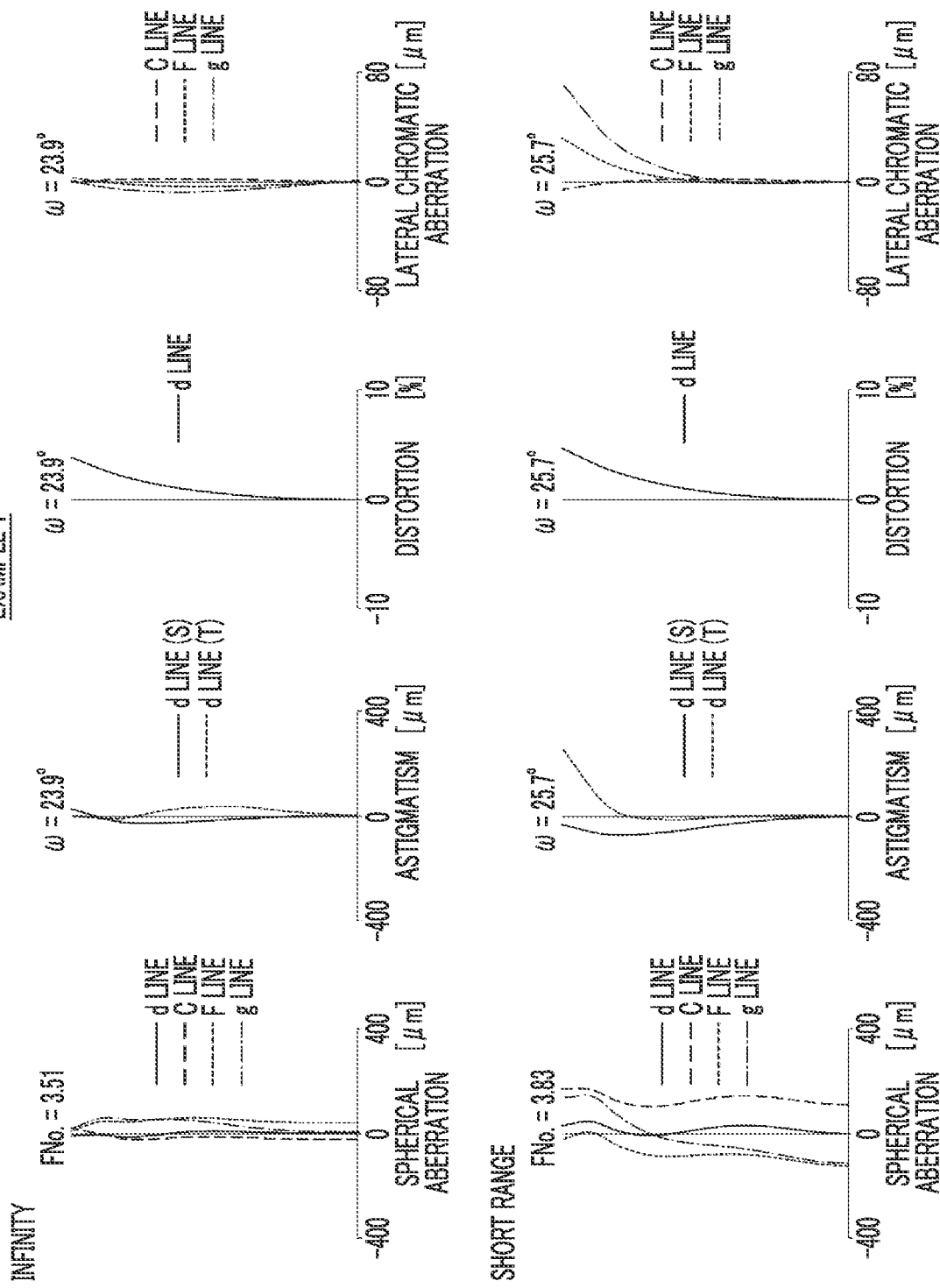
FIG. 3 is a diagram showing aberrations of the imaging lens of Example 1.

FIG. 3 shows a diagram showing aberrations of the imaging lens of Example 1. In FIG. 3, in order from the left side, spherical aberration, astigmatism, distortion, and lateral chromatic aberration are shown. FIG. 3 shows aberration diagrams in a state where the object at infinity is in focus in the upper part labeled "infinity", and shows aberration diagrams in a state where the short range object at the object distance of 21.8 mm (millimeter) is in focus in the lower part labeled "Short range". In spherical aberration diagram, aberrations at the d line, the C line, the F line, and the g line are indicated by the solid line, the long dashed line, the short dashed line, and the chain line, respectively. In the astigmatism diagram, aberration in the sagittal direction at the d line is indicated by the solid line, and aberration in the tangential direction at the d line is indicated by the short dashed line. In the distortion diagram, aberration at the d line is indicated by the solid line. In lateral chromatic aberration diagram, aberrations at the C line, the F line, and the g line are respectively indicated by the long dashed line, the short dashed line, and the chain line. In spherical aberration diagram, FNo. indicates an F number. In the other aberration diagrams, ω indicates a half angle of view. FIG. 3 shows values of FNo. and ω corresponding to the upper part in the vertical axis of each diagram.

Symbols, meanings, description methods, illustration methods, and object distances of the short range object of the respective data pieces according to Example 1 are the same as those in the following examples unless otherwise specified. Therefore, in the following description, repeated description will be omitted.

Example 2

Figure 4:
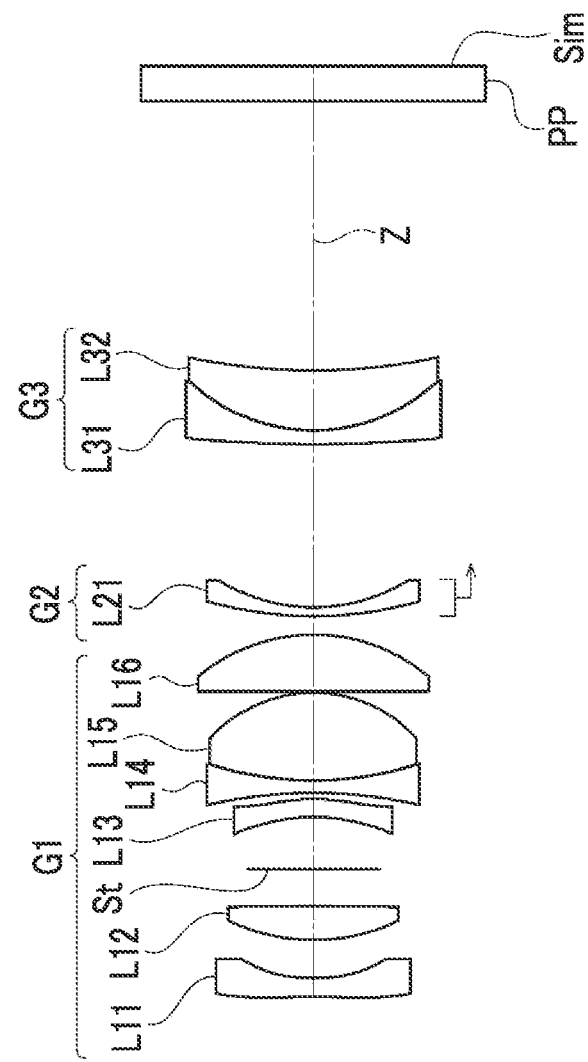
FIG. 4 is a cross-sectional view showing a configuration of an imaging lens of Example 2.
Figure 5:
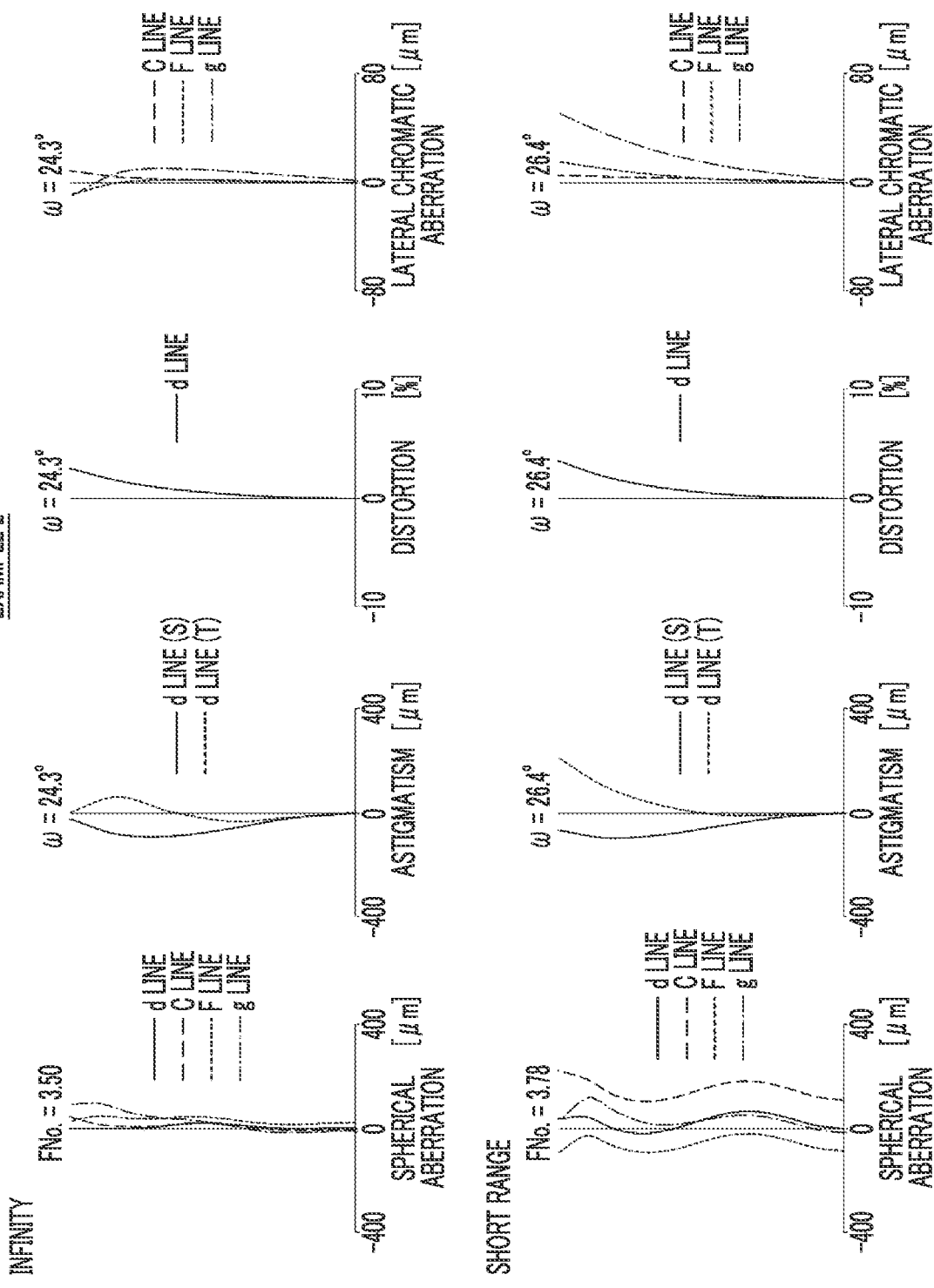
FIG. 5 is a diagram showing aberrations of the imaging lens of Example 2.

FIG. 4 is a cross-sectional view showing a configuration of the imaging lens of Example 2. The imaging lens of Example 2 has the same configuration as the outline of the imaging lens of Example 1. Regarding the imaging lens of Example 2, Table 4 shows basic lens data, Table 5 shows specification and variable surface distances, and Table 6 shows aspheric surface coefficients thereof, and FIG. 5 shows aberration diagrams. FIG. 5 shows aberration diagrams in a state where the object at infinity is in focus in the upper part, and shows aberration diagrams in a state where the short range object is in focus in the lower part.

TABLE 4

| | Example 2 | | | |
|---|---|---|---|---|
| Sn | R | D | Nd | vd |
| *1 | −32.9654 | 1.50 | 1.85135 | 40.10 |
| *2 | 19.1002 | 3.06 | | |
| 3 | 16.3865 | 2.73 | 1.95906 | 17.47 |
| 4 | −360.9642 | 3.00 | | |
| 5(St) | ∞ | 4.20 | | |
| *6 | −13.6036 | 1.44 | 1.95150 | 29.83 |
| *7 | −15.0001 | 0.50 | | |
| 8 | −39.4021 | 1.00 | 2.10420 | 17.02 |
| 9 | 28.2470 | 7.08 | 1.49700 | 81.54 |
| 10 | −11.6921 | 0.10 | | |
| 11 | 6692.7887 | 4.58 | 1.75500 | 52.32 |
| 12 | −15.0000 | DD[12] | | |
| 13 | 32.7072 | 0.70 | 1.95375 | 32.32 |
| 14 | 15.0000 | DD[14] | | |
| 15 | 113.1282 | 1.11 | 1.90043 | 37.37 |
| 16 | 15.1395 | 4.83 | 1.95906 | 17.47 |
| 17 | 50.4888 | 21.73 | | |
| 18 | ∞ | 2.85 | 1.51680 | 64.20 |
| 19 | ∞ | 0.00 | | |

TABLE 5

| | Example 2 | |
|---|---|---|
| | Infinity | Short range |
| f | 30.57 | — |
| FNo. | 3.50 | 3.78 |
| 2ω(°) | 48.6 | — |
| DD[12] | 1.50 | 8.15 |
| DD[14] | 13.09 | 6.44 |

TABLE 6

| | Example 2 | | | |
|---|---|---|---|---|
| Sn | 1 | 2 | 6 | 7 |
| KA | 1.0000000E+00 | 1.0000000E+00 | 1.0000000E+00 | 1.0000000E+00 |
| A4 | 1.0068072E−03 | 9.9896162E−04 | 2.7982966E−04 | 4.9921244E−04 |
| A6 | −3.6616398E−05 | −2.5848697E−05 | −4.0796298E−06 | −2.3624885E−06 |
| A8 | 1.2347323E−06 | 2.2701986E−07 | 4.9696020E−07 | 4.1496694E−07 |
| A10 | −3.4831930E−08 | 1.7965985E−08 | −2.6345976E−08 | −1.8233070E−08 |
| A12 | 6.8285102E−10 | −9.6820811E−10 | 4.5499473E−10 | 2.5057981E−10 |
| A14 | −7.7811635E−12 | 2.0457054E−11 | 6.1790325E−13 | 1.1272709E−12 |
| A16 | 3.8105512E−14 | −1.6440022E−13 | −7.1075673E−14 | −4.0739136E−14 |

Example 3

Figure 6:
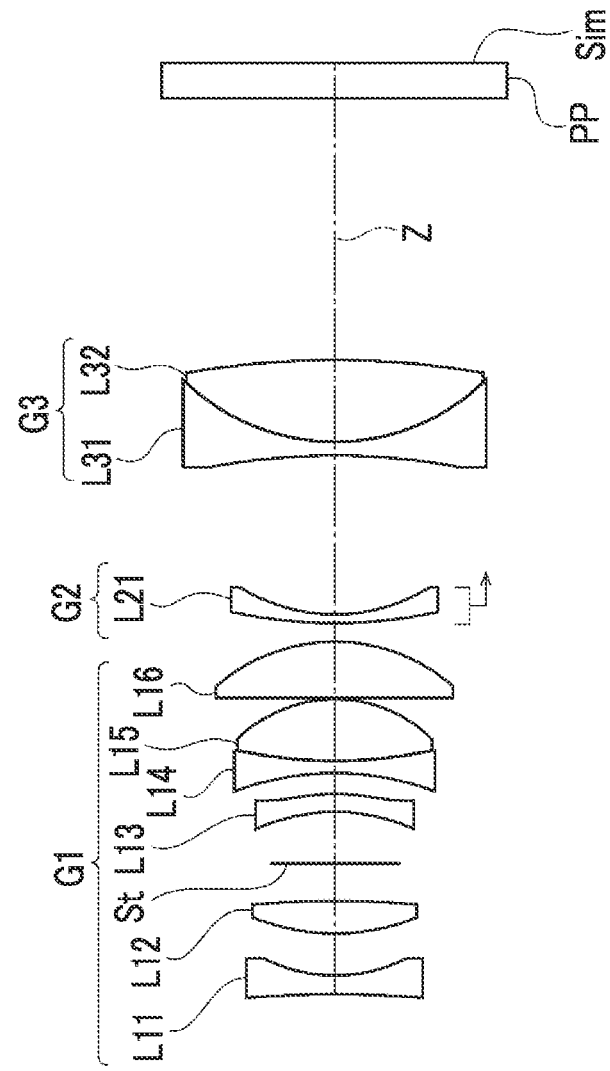
FIG. 6 is a cross-sectional view showing a configuration of an imaging lens of Example 3.
Figure 7:
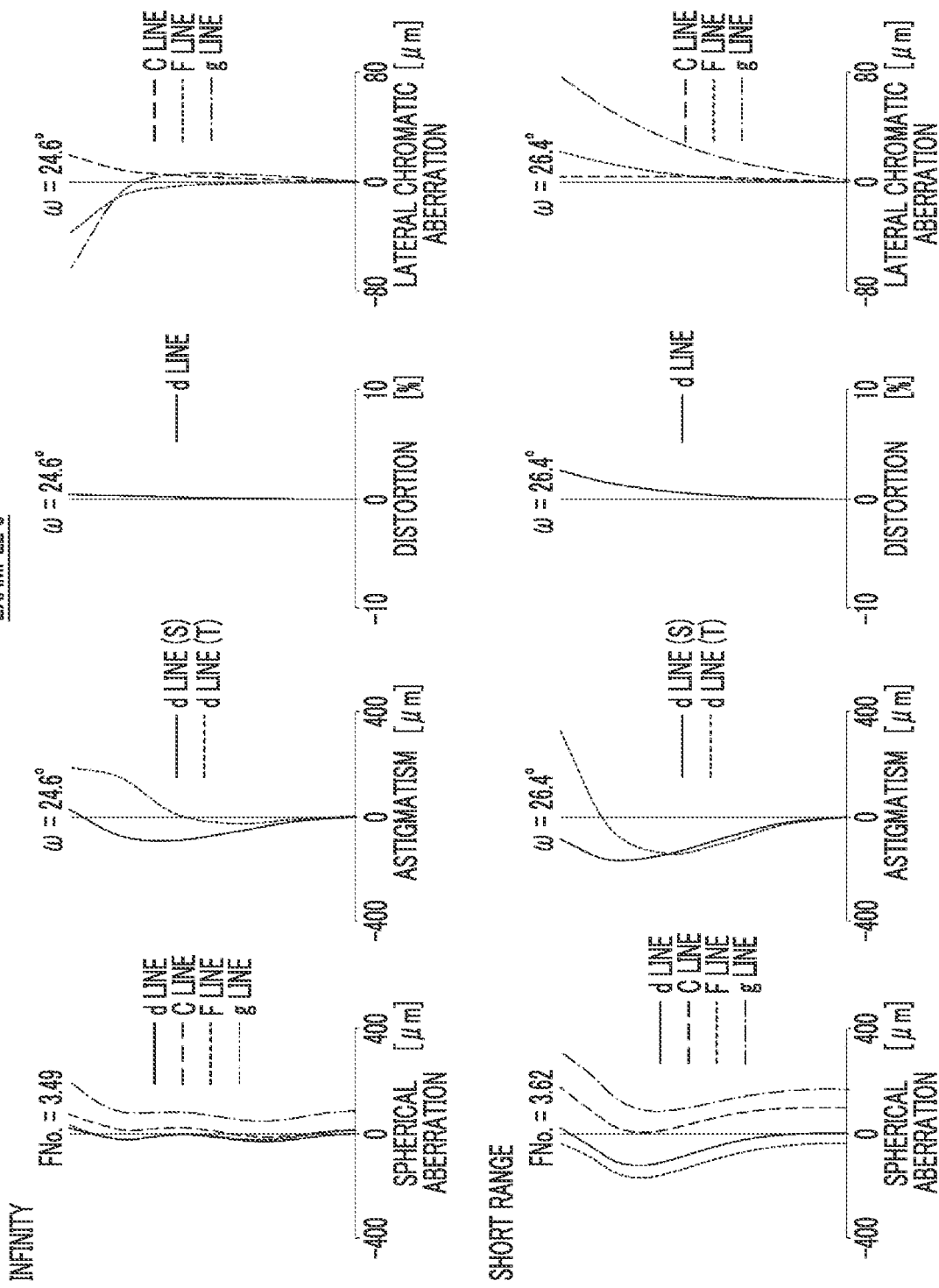
FIG. 7 is a diagram showing aberrations of the imaging lens of Example 3.

FIG. 6 is a cross-sectional view showing a configuration of the imaging lens of Example 3. The imaging lens of Example 3 has the same configuration as the outline of the imaging lens of Example 1 except that the third lens group G3 has a positive refractive power. Regarding the imaging lens of Example 3, Table 7 shows basic lens data, Table 8 shows specification and variable surface distances, and Table 9 shows aspheric surface coefficients thereof, and FIG. 7 shows aberration diagrams. FIG. 7 shows aberration diagrams in a state where the object at infinity is in focus in the upper part, and shows aberration diagrams in a state where the short range object is in focus in the lower part.

TABLE 7

Example 3

| Sn | R | D | Nd | vd |
|---|---|---|---|---|
| *1 | −39.9300 | 1.50 | 1.69350 | 53.20 |
| *2 | 15.0000 | 3.37 | | |
| 3 | 18.1918 | 2.63 | 1.92286 | 20.88 |
| 4 | −81.2719 | 3.00 | | |
| 5(St) | ∞ | 4.20 | | |
| *6 | −13.4614 | 1.44 | 1.80610 | 40.73 |
| *7 | −15.0000 | 1.67 | | |
| 8 | −23.7908 | 1.00 | 1.98613 | 16.48 |
| 9 | 38.8893 | 4.97 | 1.49700 | 81.54 |
| 10 | −11.5847 | 0.10 | | |
| 11 | 23910.0224 | 4.54 | 1.83481 | 42.74 |
| 12 | −14.9999 | DD[12] | | |
| 13 | 40.2266 | 0.70 | 2.00100 | 29.13 |
| 14 | 15.0000 | DD[14] | | |
| 15 | −57.7386 | 1.11 | 1.75500 | 52.32 |
| 16 | 18.0869 | 6.60 | 1.85896 | 22.73 |
| 17 | −72.8501 | 21.12 | | |
| 18 | ∞ | 2.85 | 1.51680 | 64.20 |
| 19 | ∞ | 0.00 | | |

TABLE 8

Example 3

| | Infinity | Short range |
|---|---|---|
| f | 30.89 | — |
| FNo. | 3.49 | 3.62 |
| 2ω(°) | 49.2 | — |
| DD[12] | 1.50 | 8.19 |
| DD[14] | 12.74 | 6.05 |

TABLE 9

Example 3

| Sn | 1 | 2 | 6 | 7 |
|---|---|---|---|---|
| KA | 1.0000000E+00 | 1.0000000E+00 | 1.0000000E+00 | 1.0000000E+00 |
| A4 | 4.4714088E−04 | 4.0468830E−04 | 2.6821123E−04 | 5.1191122E−04 |
| A6 | −1.5615669E−05 | −1.2677685E−05 | −1.0047025E−06 | 1.3165953E−06 |
| A8 | 4.1506773E−07 | 1.3238055E−07 | 2.1100312E−07 | 1.4370890E−07 |
| A10 | −7.6869176E−09 | 2.9595909E−09 | −1.4086352E−08 | −7.9812603E−09 |
| A12 | 6.7294383E−11 | −1.1801299E−10 | 2.2172185E−10 | 6.7894349E−11 |
| A14 | 2.0356341E−13 | 1.0898817E−12 | −8.4032538E−14 | 1.2999462E−12 |
| A16 | −5.8944597E−15 | 1.2687969E−15 | −1.5510424E−14 | −1.7303065E−14 |

Example 4

Figure 8:
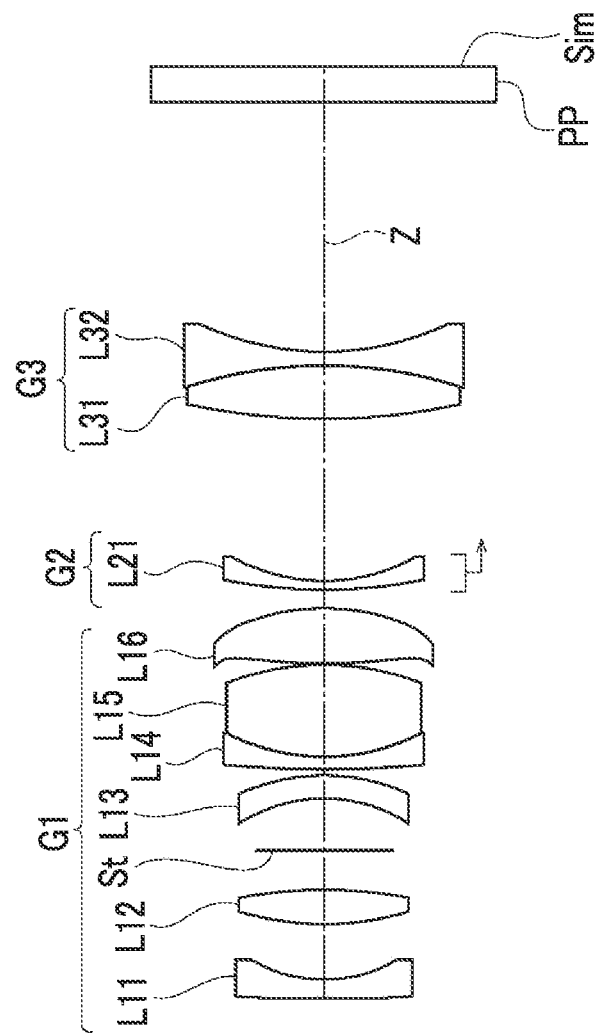
FIG. 8 is a cross-sectional view showing a configuration of an imaging lens of Example 4.
Figure 9:
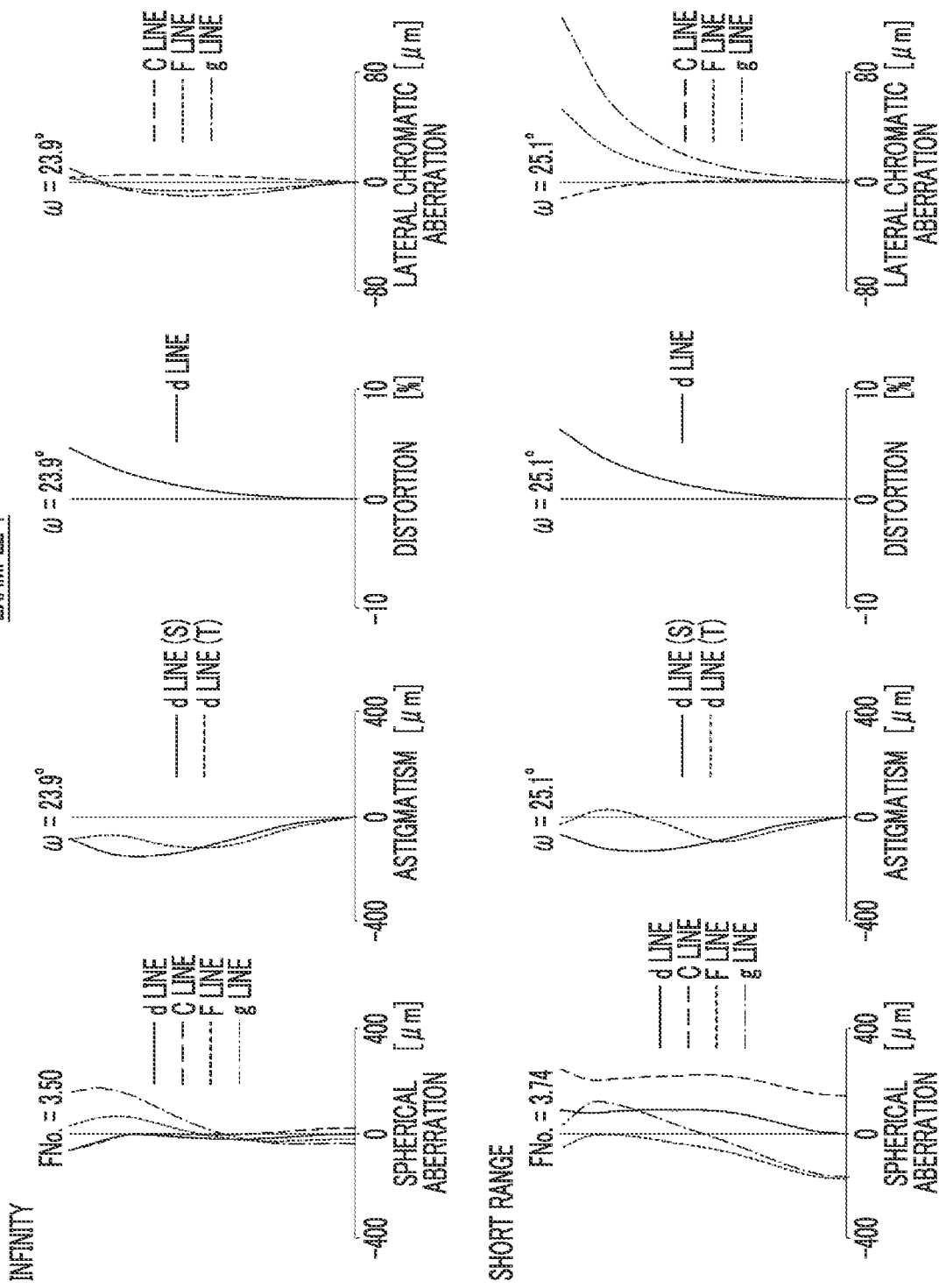
FIG. 9 is a diagram showing aberrations of the imaging lens of Example 4.

FIG. 8 is a cross-sectional view showing a configuration of the imaging lens of Example 4. The imaging lens of Example 4 has the same configuration as the outline of the imaging lens of Example 1 except that the third lens group G3 has a positive refractive power. Regarding the imaging lens of Example 4, Table 10 shows basic lens data, Table 11 shows specification and variable surface distances, and Table 12 shows aspheric surface coefficients thereof, and FIG. 9 shows aberration diagrams. FIG. 9 shows aberration diagrams in a state where the object at infinity is in focus in the upper part, and shows aberration diagrams in a state where the short range object is in focus in the lower part.

TABLE 10

Example 4

| Sn | R | D | Nd | vd |
|---|---|---|---|---|
| *1 | −74.9093 | 1.51 | 1.80139 | 45.45 |
| *2 | 15.0000 | 4.44 | | |
| 3 | 24.3469 | 2.77 | 1.89286 | 20.36 |
| 4 | −37.9748 | 3.17 | | |
| 5(St) | ∞ | 4.20 | | |
| 6 | −13.0000 | 1.85 | 1.95375 | 32.32 |
| 7 | −17.0777 | 0.50 | | |
| 8 | 94.5698 | 1.00 | 2.10420 | 17.02 |
| 9 | 17.6079 | 7.41 | 1.49700 | 81.54 |

TABLE 10-continued

Example 4

| Sn | R | D | Nd | vd |
|---|---|---|---|---|
| 10 | −22.6664 | 0.10 | | |
| *11 | 40.9761 | 4.46 | 1.72903 | 54.04 |
| *12 | −18.9513 | DD[12] | | |
| 13 | 42.7802 | 0.70 | 2.00100 | 29.13 |
| 14 | 15.6323 | DD[14] | | |
| 15 | 53.9943 | 4.30 | 1.98613 | 16.48 |
| 16 | −37.4688 | 1.11 | 1.63980 | 34.47 |
| 17 | 24.4565 | 20.12 | | |
| 18 | ∞ | 2.85 | 1.51680 | 64.20 |
| 19 | ∞ | 0.00 | | |

TABLE 11

Example 4

| | Infinity | Short range |
|---|---|---|
| f | 30.58 | — |
| FNo. | 3.50 | 3.74 |
| 2ω(°) | 47.8 | — |
| DD[12] | 1.50 | 8.60 |
| DD[14] | 13.00 | 5.90 |

TABLE 12

Example 4

| Sn | 1 | 2 | 11 | 12 |
|---|---|---|---|---|
| KA | 1.0000000E+00 | 1.0000000E+00 | 1.0000000E+00 | 1.0000000E+00 |
| A4 | 4.9513673E−04 | 5.1070948E−04 | −5.0278071E−05 | −4.7735075E−06 |
| A6 | −1.4336499E−05 | −1.1154994E−05 | 2.0210526E−07 | 8.9720488E−08 |
| A8 | 3.0349421E−07 | 1.0643003E−07 | −1.0746625E−08 | −9.4578550E−09 |
| A10 | −3.2089040E−09 | 1.7580614E−09 | −7.1777986E−11 | −9.7421867E−12 |
| A12 | −2.4883589E−11 | −5.7159460E−11 | 1.4612941E−12 | 4.3408532E−13 |
| A14 | 1.0388309E−12 | 9.2715306E−14 | 4.3964308E−15 | 3.3658735E−16 |
| A16 | −7.9051067E−15 | 5.7177817E−15 | −4.2641527E−16 | −1.6719442E−16 |

Example 5

Figure 10:
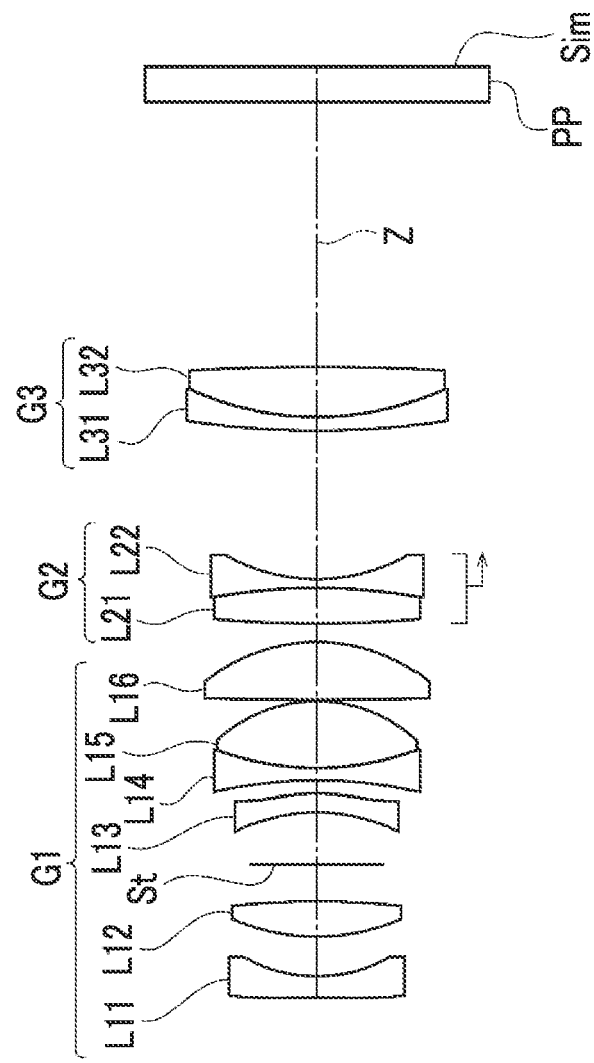
FIG. 10 is a cross-sectional view showing a configuration of an imaging lens of Example 5.
Figure 11:
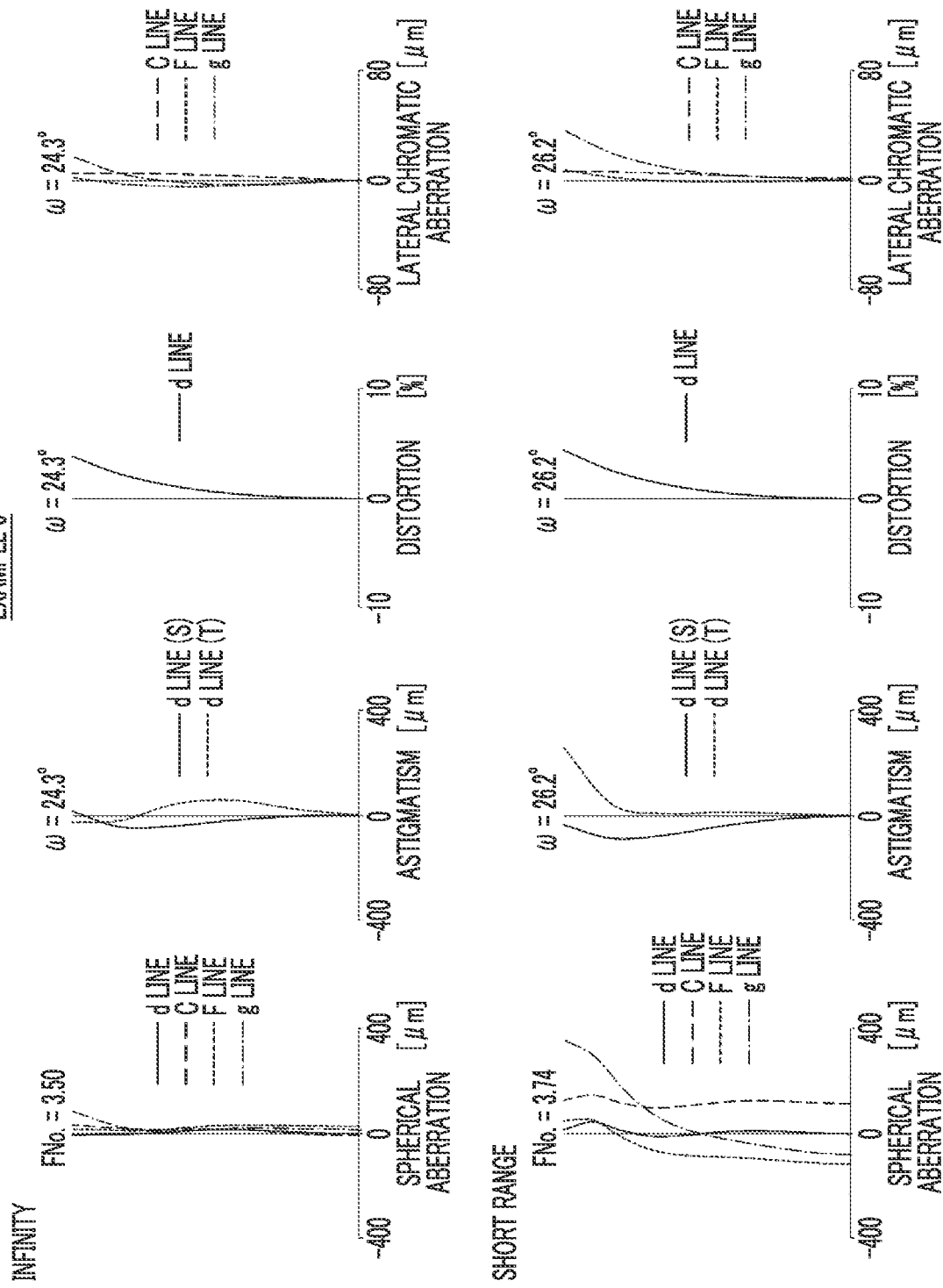
FIG. 11 is a diagram showing aberrations of the imaging lens of Example 5.

FIG. 10 is a cross-sectional view showing a configuration of the imaging lens of Example 5. The imaging lens of Example 5 has the same configuration as the outline of the imaging lens of Example 1 except that the third lens group G3 has a positive refractive power and the second lens group G2 consists of two lenses L21 and L22. Regarding the imaging lens of Example 5, Table 13 shows basic lens data, Table 14 shows specification and variable surface distances, and Table 15 shows aspheric surface coefficients thereof, and FIG. 11 shows aberration diagrams. FIG. 11 shows aberration diagrams in a state where the object at infinity is in focus in the upper part, and shows aberration diagrams in a state where the short range object is in focus in the lower part.

TABLE 13

Example 5

| Sn | R | D | Nd | vd |
|---|---|---|---|---|
| *1 | −76.1348 | 1.73 | 1.95150 | 29.83 |
| *2 | 15.0001 | 3.19 | | |
| 3 | 18.0725 | 2.84 | 1.92286 | 20.88 |
| 4 | −66.0410 | 3.00 | | |
| 5(St) | ∞ | 4.20 | | |
| *6 | −13.0001 | 1.44 | 1.95150 | 29.83 |
| *7 | −16.5923 | 1.06 | | |
| 8 | −38.7778 | 1.00 | 1.92286 | 18.90 |
| 9 | 24.2741 | 5.39 | 1.49700 | 81.54 |
| 10 | −12.3773 | 0.10 | | |
| 11 | 321.0749 | 4.67 | 1.80400 | 46.53 |
| 12 | −15.0000 | DD[12] | | |
| 13 | 105.7274 | 2.87 | 2.10420 | 17.02 |
| 14 | −48.1042 | 0.71 | 1.91082 | 35.25 |
| 15 | 15.5506 | DD[15] | | |
| 16 | 72.8761 | 1.10 | 1.80400 | 46.53 |
| 17 | 25.7022 | 4.05 | 1.48749 | 70.24 |
| 18 | −183.2984 | 21.30 | | |
| 19 | ∞ | 2.85 | 1.51680 | 64.20 |
| 20 | ∞ | 0.00 | | |

TABLE 14

Example 5

| | Infinity | Short range |
|---|---|---|
| f | 30.24 | — |
| FNo. | 3.50 | 3.74 |
| 2ω(°) | 48.6 | — |
| DD[12] | 1.50 | 7.43 |
| DD[15] | 11.99 | 6.06 |

TABLE 15

Example 5

| Sn | 1 | 2 | 6 | 7 |
|---|---|---|---|---|
| KA | 1.0000000E+00 | 1.0000000E+00 | 1.0000000E+00 | 1.0000000E+00 |
| A4 | 4.7950080E−04 | 4.9649727E−04 | 2.97010703E−04 | 4.5267274E−04 |
| A6 | −1.2768788E−05 | −1.2408547E−05 | −7.3623094E−07 | 8.7334220E−07 |
| A8 | 2.2581673E−07 | 1.4782551E−07 | −3.6350826E−08 | −2.5119411E−08 |
| A10 | −1.4474178E−09 | 1.1413604E−09 | −1.3747205E−09 | −1.0133429E−09 |
| A12 | −3.4512091E−11 | −4.7074741E−11 | 1.7369773E−11 | 1.0990016E−11 |
| A14 | 7.5137553E−13 | −6.2725959E−13 | 2.0405753E−13 | 8.4017708E−14 |
| A16 | −4.0449003E−15 | 1.9481145E−14 | −3.7613652E−15 | −1.7827630E−16 |

Example 6

Figure 12:
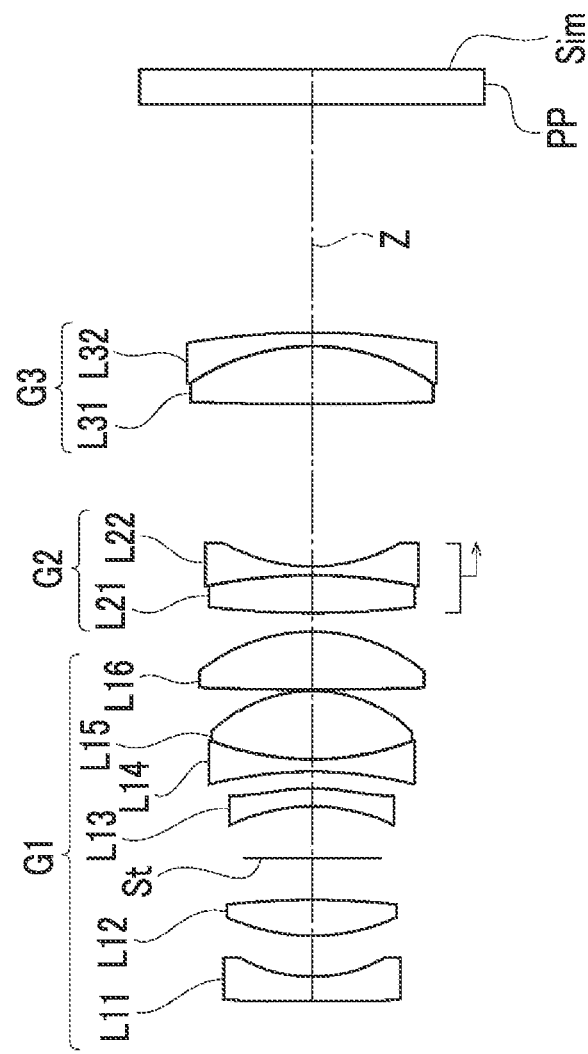
FIG. 12 is a cross-sectional view showing a configuration of an imaging lens of Example 6.
Figure 13:
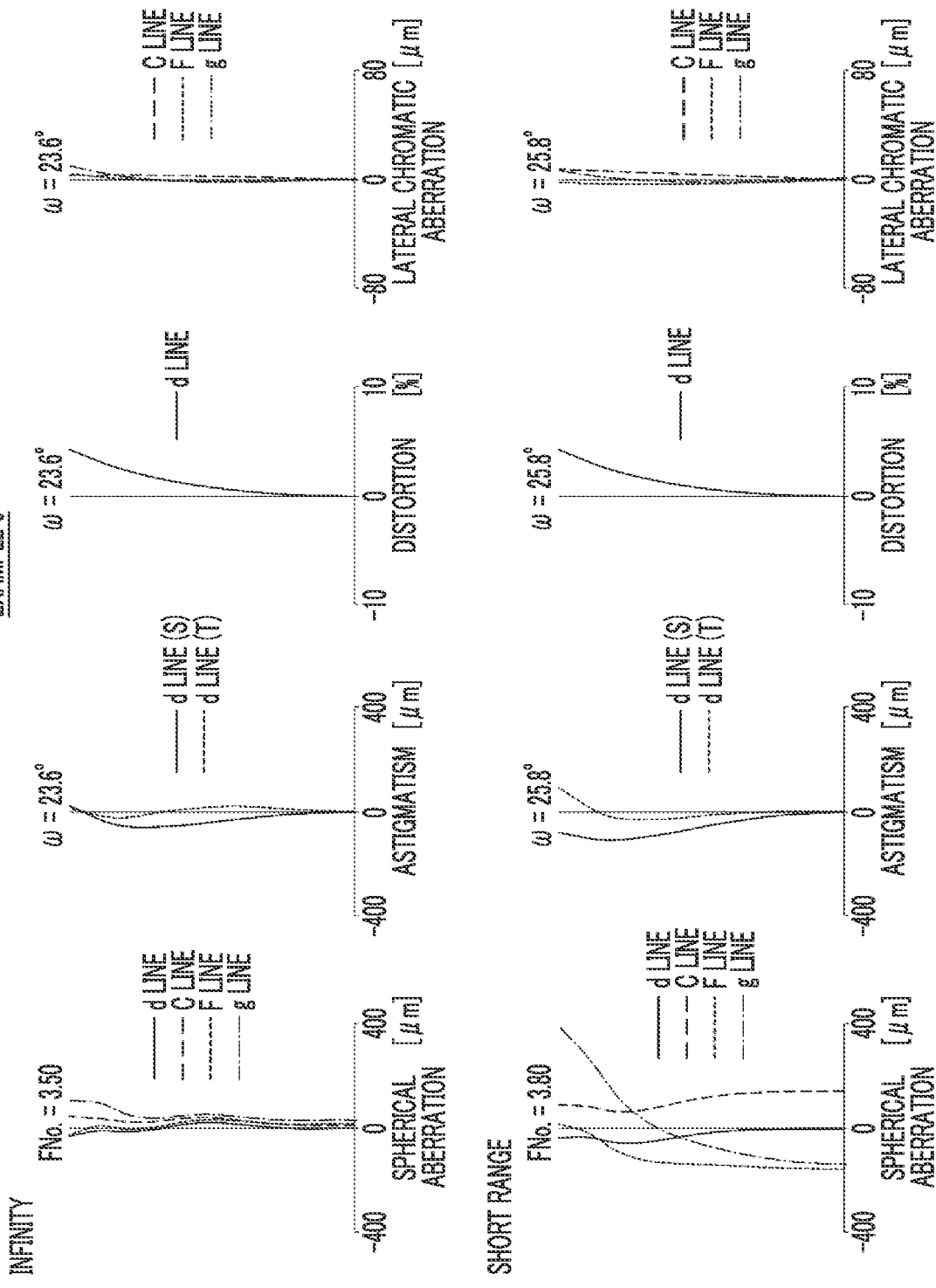
FIG. 13 is a diagram showing aberrations of the imaging lens of Example 6.

FIG. 12 is a cross-sectional view showing a configuration of the imaging lens of Example 6. The imaging lens of Example 6 has the same configuration as the outline of the imaging lens of Example 1 except that the second lens group G2 consists of two lenses L21 and L22. Regarding the imaging lens of Example 6, Table 16 shows basic lens data, Table 17 shows specification and variable surface distances, and Table 18 shows aspheric surface coefficients thereof, and FIG. 13 shows aberration diagrams. FIG. 13 shows aberration diagrams in a state where the object at infinity is in focus in the upper part, and shows aberration diagrams in a state where the short range object is in focus in the lower part.

TABLE 16

Example 6

| Sn | R | D | Nd | vd |
|---|---|---|---|---|
| *1 | −64.5719 | 1.92 | 1.88202 | 37.22 |
| *2 | 15.0000 | 3.29 | | |
| 3 | 17.1827 | 2.89 | 1.85451 | 25.15 |
| 4 | −68.0034 | 3.36 | | |
| 5(St) | ∞ | 4.20 | | |
| *6 | −13.4675 | 1.44 | 1.95150 | 29.83 |
| *7 | −16.2635 | 1.34 | | |
| 8 | −35.6978 | 1.00 | 1.92286 | 20.88 |
| 9 | 23.8289 | 5.51 | 1.49700 | 81.54 |

TABLE 16-continued

Example 6

| Sn | R | D | Nd | vd |
|---|---|---|---|---|
| 10 | −12.0465 | 0.10 | | |
| 11 | 273.9307 | 4.69 | 1.78800 | 47.37 |
| 12 | −15.0001 | DD[12] | | |
| 13 | 74.3499 | 3.04 | 2.10420 | 17.02 |
| 14 | −42.6291 | 0.71 | 1.95375 | 32.32 |
| 15 | 15.0000 | DD[15] | | |
| 16 | 258.8635 | 4.69 | 1.48749 | 70.24 |
| 17 | −18.1519 | 1.10 | 1.81600 | 46.62 |
| 18 | −62.7756 | 18.39 | | |
| 19 | ∞ | 2.85 | 1.51680 | 64.20 |
| 20 | ∞ | 0.00 | | |

TABLE 17

Example 6

| | Infinity | Short range |
|---|---|---|
| f | 31.22 | — |
| FNo. | 3.50 | 3.80 |
| 2ω(°) | 47.2 | — |
| DD[12] | 1.50 | 7.30 |
| DD[15] | 13.00 | 7.20 |

TABLE 18

Example 6

| Sn | 1 | 2 | 6 | 7 |
|---|---|---|---|---|
| KA | 1.0000000E+00 | 1.0000000E+00 | 1.0000000E+00 | 1.0000000E+00 |
| A4 | 4.6653916E−04 | 4.7809649E−04 | 2.7668107E−04 | 4.4873551E−04 |
| A6 | −1.2304628E−05 | −1.1383025E−05 | −3.1526450E−07 | 1.5184738E−06 |
| A8 | 2.2964645E−07 | 1.0984164E−07 | −2.3411177E−08 | −2.5516607E−08 |
| A10 | −2.2792735E−09 | 1.5915980E−09 | −2.9892902E−09 | −1.6845313E−09 |
| A12 | −8.8886102E−12 | −3.6617423E−11 | 3.7842314E−11 | 1.3725476E−11 |
| A14 | 4.0832323E−13 | −1.0568088E−12 | 1.8954014E−13 | 2.8227264E−13 |
| A16 | −2.2479098E−15 | 2.4136770E−14 | −1.1887109E−15 | −1.1082004E−15 |

Example 7

Figure 14:
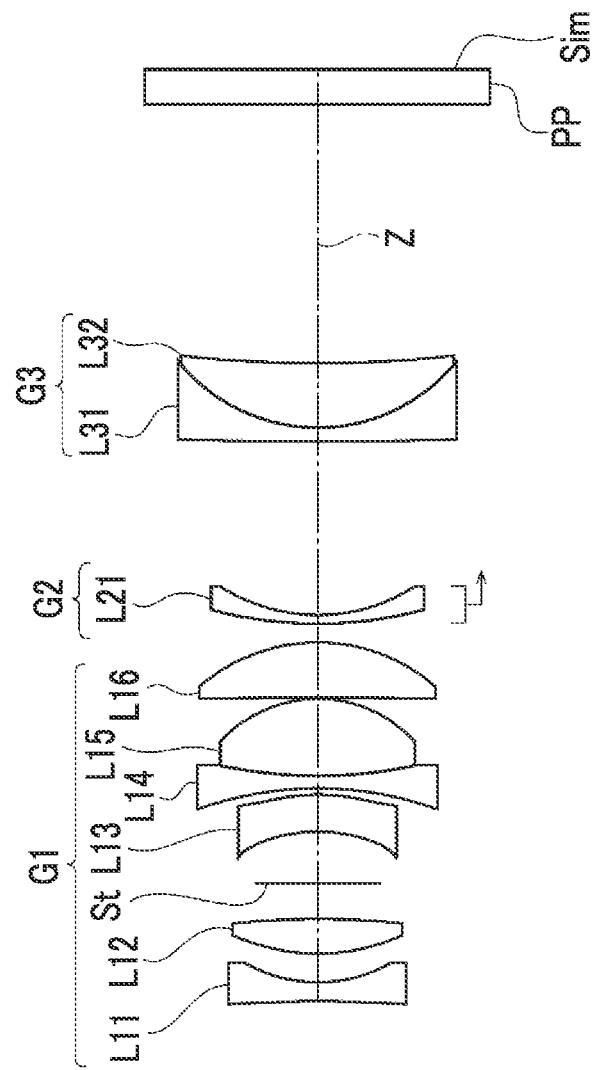
FIG. 14 is a cross-sectional view showing a configuration of an imaging lens of Example 7.
Figure 15:
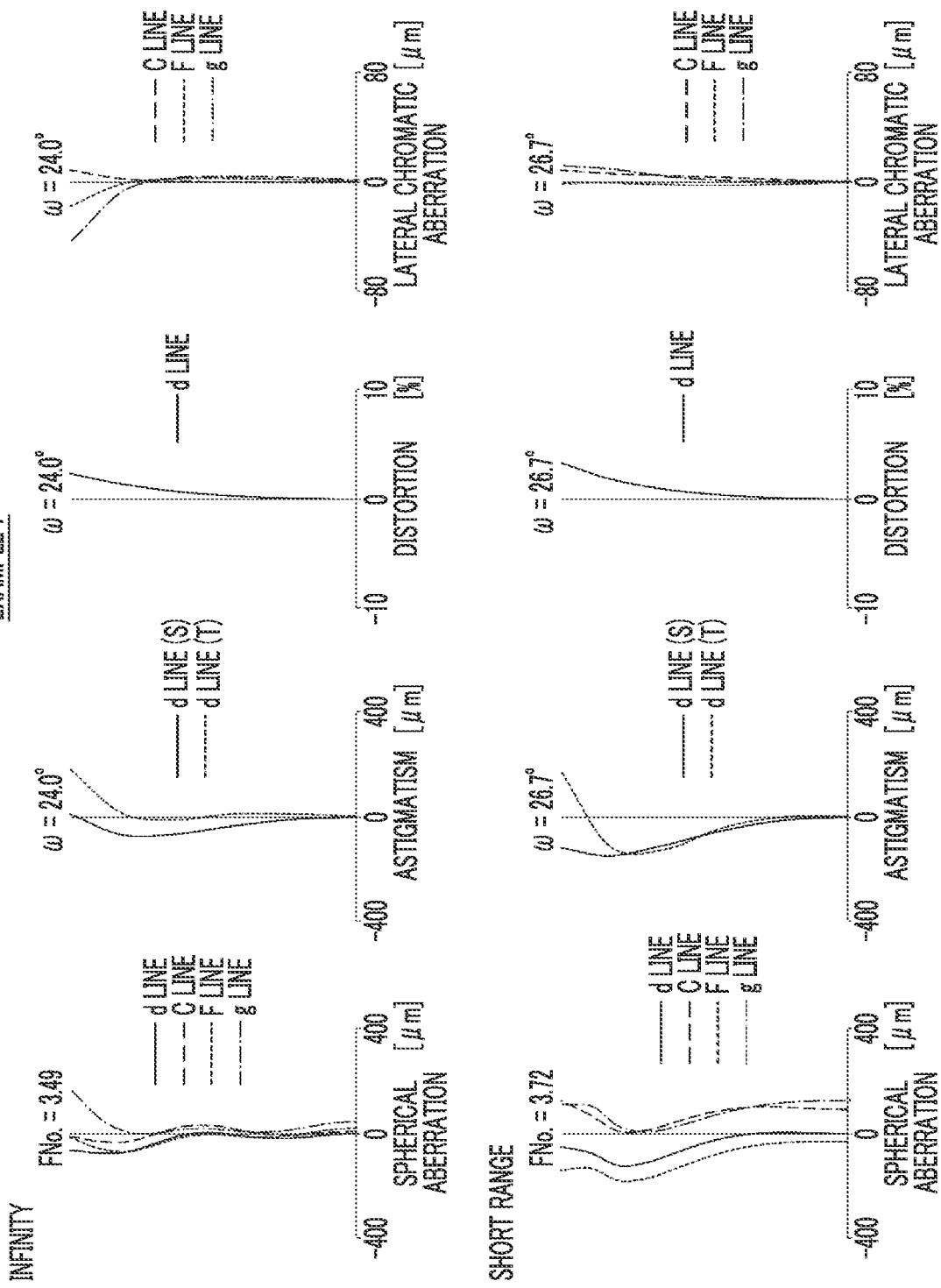
FIG. 15 is a diagram showing aberrations of the imaging lens of Example 7.

FIG. 14 is a cross-sectional view showing a configuration of the imaging lens of Example 7. The imaging lens of Example 7 has the same configuration as the outline of the imaging lens of Example 1. Regarding the imaging lens of Example 7, Table 19 shows basic lens data, Table 20 shows specification and variable surface distances, and Table 21 shows aspheric surface coefficients thereof, and FIG. 15 shows aberration diagrams. FIG. 15 shows aberration diagrams in a state where the object at infinity is in focus in the upper part, and shows aberration diagrams in a state where the short range object is in focus in the lower part.

TABLE 19

Example 7

| Sn | R | D | Nd | vd |
|---|---|---|---|---|
| *1 | −34.3887 | 1.52 | 1.69350 | 53.20 |
| *2 | 15.0000 | 2.30 | | |
| 3 | 17.2987 | 2.78 | 1.89286 | 20.36 |
| 4 | −71.2257 | 2.84 | | |
| 5(St) | ∞ | 4.20 | | |
| *6 | −13.8926 | 3.00 | 1.80610 | 40.73 |
| *7 | −15.0000 | 0.50 | | |
| 8 | −29.6707 | 1.00 | 2.10420 | 17.02 |
| 9 | 37.7240 | 6.23 | 1.43875 | 94.66 |

TABLE 19-continued

Example 7

| Sn | R | D | Nd | vd |
|---|---|---|---|---|
| 10 | −11.0000 | 0.10 | | |
| 11 | −454.0531 | 4.45 | 1.81600 | 46.62 |
| 12 | −14.9999 | DD[12] | | |
| 13 | 34.4034 | 0.70 | 1.91082 | 35.25 |
| 14 | 15.0000 | DD[14] | | |
| 15 | 426.0337 | 1.11 | 2.05090 | 26.94 |
| 16 | 15.0000 | 5.20 | 2.10420 | 17.02 |
| 17 | 104.5220 | 20.86 | | |
| 18 | ∞ | 2.85 | 1.51680 | 64.20 |
| 19 | ∞ | 0.00 | | |

TABLE 20

Example 7

| | Infinity | Short range |
|---|---|---|
| f | 31.17 | — |
| FNo. | 3.49 | 3.72 |
| 2ω(°) | 48.0 | — |
| DD[12] | 1.50 | 8.80 |
| DD[14] | 13.93 | 6.63 |

TABLE 21

Example 7

| Sn | 1 | 2 | 6 | 7 |
|---|---|---|---|---|
| KA | 1.0000000E+00 | 1.0000000E+00 | 1.0000000E+00 | 1.0000000E+00 |
| A4 | 6.4700613E−04 | 6.1666034E−04 | −1.8751975E−05 | 2.8918021E−04 |
| A6 | −2.3286621E−05 | −2.0041120E−05 | −4.4756989E−06 | −9.9270820E−07 |
| A8 | 6.2518974E−07 | 3.0347800E−07 | 3.2051659E−07 | 1.5664277E−07 |
| A10 | −9.0945153E−09 | 3.7338917E−09 | −8.6836156E−09 | −3.8562553E−09 |
| A12 | −4.5966648E−11 | −3.0068723E−10 | −3.1960964E−10 | −4.4144242E−11 |
| A14 | 3.5302045E−12 | 5.3973200E−12 | 2.0533008E−11 | 3.5014115E−12 |
| A16 | −3.3846493E−14 | −3.0028815E−14 | −3.0659933E−13 | −4.5253572E−14 |

Example 8

Figure 16:
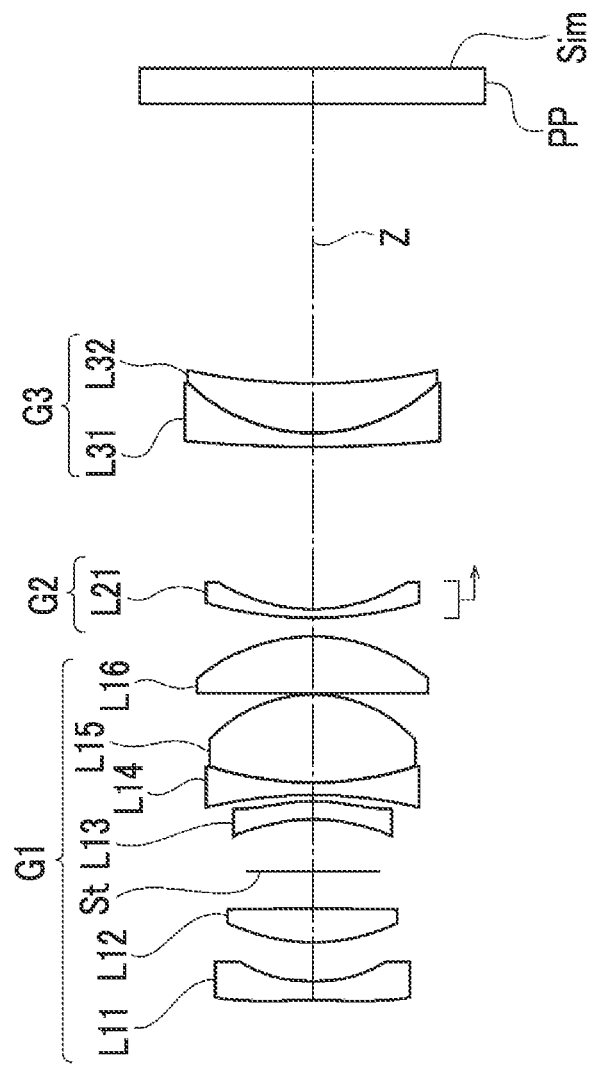
FIG. 16 is a cross-sectional view showing a configuration of an imaging lens of Example 8.
Figure 17:
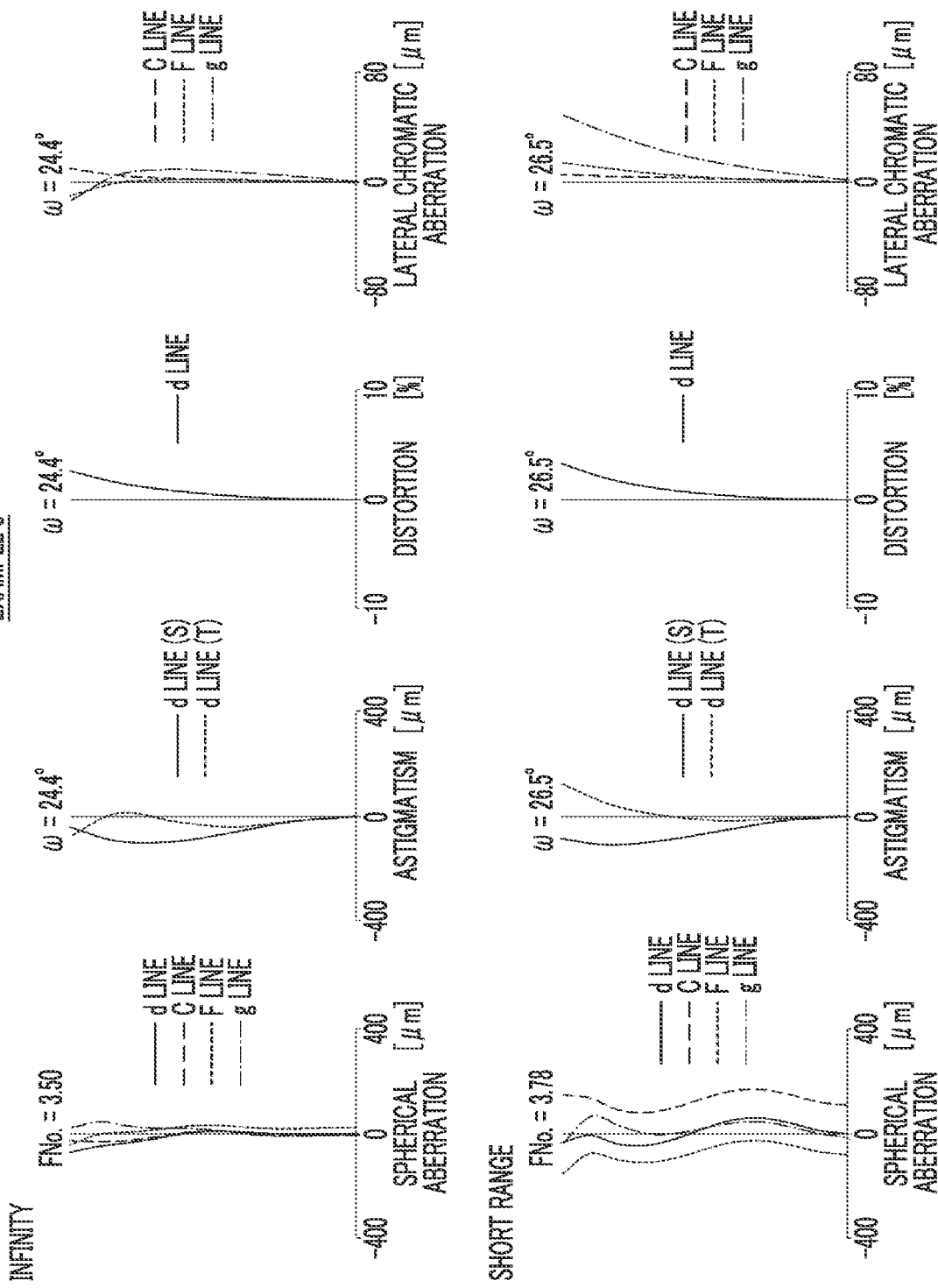
FIG. 17 is a diagram showing aberrations of the imaging lens of Example 8.

FIG. 16 is a cross-sectional view showing a configuration of the imaging lens of Example 8. The imaging lens of Example 8 has the same configuration as the outline of the imaging lens of Example 1. Regarding the imaging lens of Example 8, Table 22 shows basic lens data, Table 23 shows specification and variable surface distances, and Table 24 shows aspheric surface coefficients thereof, and FIG. 17 shows aberration diagrams. FIG. 17 shows aberration diagrams in a state where the object at infinity is in focus in the upper part, and shows aberration diagrams in a state where the short range object is in focus in the lower part.

TABLE 22

| Example 8 | | | | |
|---|---|---|---|---|
| Sn | R | D | Nd | vd |
| *1 | −32.1160 | 1.52 | 1.85135 | 40.10 |
| *2 | 19.2455 | 3.12 | | |
| 3 | 16.4031 | 2.73 | 1.95906 | 17.47 |
| 4 | −343.6089 | 3.00 | | |
| 5(St) | ∞ | 4.20 | | |
| *6 | −13.6458 | 1.44 | 1.95150 | 29.83 |
| *7 | −15.0001 | 0.50 | | |
| 8 | −39.1819 | 1.00 | 2.10420 | 17.02 |
| 9 | 27.8315 | 7.10 | 1.49700 | 81.54 |

TABLE 22-continued

| Example 8 | | | | |
|---|---|---|---|---|
| Sn | R | D | Nd | vd |
| 10 | −11.6736 | 0.10 | | |
| 11 | 3882.5693 | 4.58 | 1.75500 | 52.32 |
| 12 | −15.0000 | DD[12] | | |
| 13 | 32.6851 | 0.70 | 1.95375 | 32.32 |
| 14 | 15.0001 | DD[14] | | |
| 15 | 114.7218 | 1.11 | 1.90043 | 37.37 |
| 16 | 15.0206 | 4.00 | 1.95906 | 17.47 |
| 17 | 51.3398 | 22.55 | | |
| 18 | ∞ | 2.85 | 1.51680 | 64.20 |
| 19 | ∞ | 0.00 | | |

| Example 8 | | |
|---|---|---|
| | Infinity | Short range |
| f | 30.53 | — |
| FNo. | 3.50 | 3.78 |
| 2ω(°) | 48.8 | — |
| DD[12] | 1.50 | 8.06 |
| DD[14] | 13.01 | 6.45 |

TABLE 24

| Example 8 | | | | |
|---|---|---|---|---|
| Sn | 1 | 2 | 6 | 7 |
| KA | 1.0000000E+00 | 1.0000000E+00 | 1.0000000E+00 | 1.0000000E+00 |
| A4 | 1.0098274E−03 | 1.0030225E−03 | 2.7638047E−04 | 4.9755792E−04 |
| A6 | −3.6799338E−05 | −2.6520142E−05 | −3.9704334E−06 | −2.1885206E−06 |
| A8 | 1.2419018E−06 | 2.7913087E−07 | 4.9361998E−07 | 4.1050351E−07 |
| A10 | −3.4763597E−08 | 1.6248232E−08 | −2.6734232E−08 | −1.8544479E−08 |
| A12 | 6.6909886E−10 | −9.6237487E−10 | 4.8348746E−10 | 2.7045010E−10 |
| A14 | −7.4169785E−12 | 2.1280573E−11 | 9.3699637E−15 | 7.8257645E−13 |
| A16 | 3.5051332E−14 | −1.7683301E−13 | −6.8028293E−14 | −3.9625027E−14 |

Example 9

Figure 18:
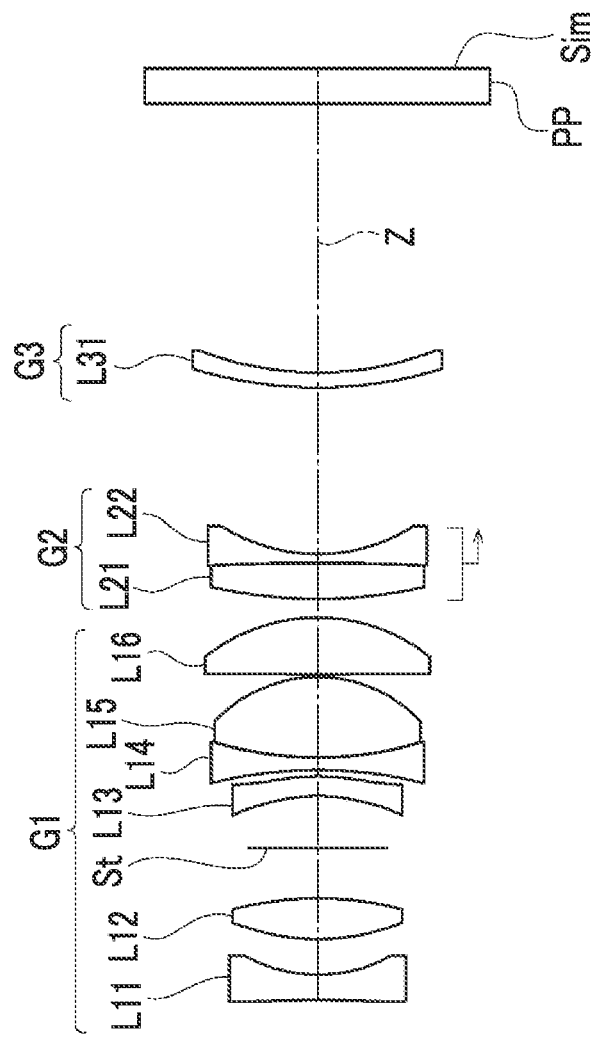
FIG. 18 is a cross-sectional view showing a configuration of an imaging lens of Example 9.
Figure 19:
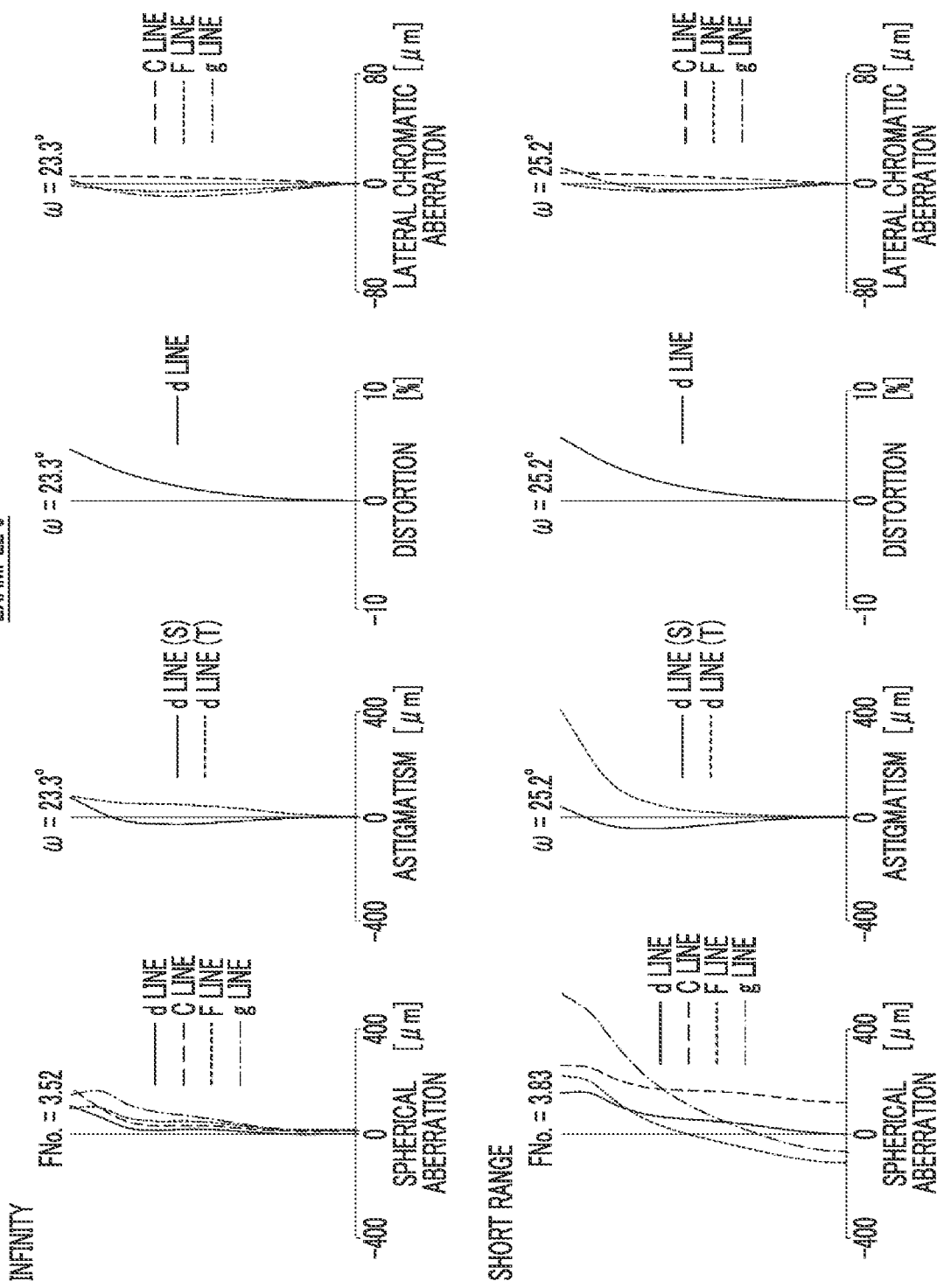
FIG. 19 is a diagram showing aberrations of the imaging lens of Example 9.

FIG. 18 is a cross-sectional view showing a configuration of the imaging lens of Example 9. The imaging lens of Example 9 has the same configuration as the outline of the imaging lens of Example 1 except that the second lens group G2 consists of two lenses L21 and L22 and the third lens group G3 consists of only one lens L31. Regarding the imaging lens of Example 9, Table 25 shows basic lens data, Table 26 shows specification and variable surface distances, and Table 27 shows aspheric surface coefficients thereof, and FIG. 19 shows aberration diagrams. FIG. 19 shows aberration diagrams in a state where the object at infinity is in focus in the upper part, and shows aberration diagrams in a state where the short range object is in focus in the lower part.

TABLE 25

Example 9

| Sn | R | D | Nd | vd |
|---|---|---|---|---|
| *1 | −49.5824 | 2.05 | 1.88202 | 37.22 |
| *2 | 15.0471 | 2.86 | | |
| 3 | 19.0059 | 3.28 | 1.76182 | 26.52 |
| 4 | −27.8262 | 4.05 | | |
| 5(St) | ∞ | 4.20 | | |
| *6 | −13.4817 | 1.59 | 1.95150 | 29.83 |
| *7 | −15.9723 | 0.50 | | |

TABLE 25-continued

Example 9

| Sn | R | D | Nd | vd |
|---|---|---|---|---|
| 8 | −36.5253 | 1.00 | 1.92286 | 20.88 |
| 9 | 29.4758 | 6.50 | 1.43875 | 94.66 |
| 10 | −11.8166 | 0.22 | | |
| 11 | 3545.4494 | 4.57 | 1.72916 | 54.68 |
| 12 | −15.0394 | DD[12] | | |
| 13 | 40.7393 | 2.90 | 1.98613 | 16.48 |
| 14 | −184.1466 | 0.71 | 1.95375 | 32.32 |
| 15 | 15.0001 | DD[15] | | |
| 16 | 35.7410 | 1.20 | 1.48749 | 70.24 |
| 17 | 27.3588 | 21.67 | | |
| 18 | ∞ | 2.85 | 1.51680 | 64.20 |
| 19 | ∞ | 0.00 | | |

TABLE 26

Example 9

| | Infinity | Short range |
|---|---|---|
| f | 31.55 | — |
| FNo. | 3.52 | 3.83 |
| 2ω(°) | 46.6 | — |
| DD[12] | 1.50 | 9.13 |
| DD[15] | 13.35 | 5.72 |

TABLE 27

Example 9

| Sn | 1 | 2 | 6 | 7 |
|---|---|---|---|---|
| KA | 1.0000000E+00 | 1.0000000E+00 | 1.0000000E+00 | 1.0000000E+00 |
| A4 | 3.9790571E−04 | 4.1841533E−04 | 2.9642567E−04 | 4.2978301E−04 |
| A6 | −1.0171476E−05 | −9.0162694E−06 | −5.6382060E−07 | 8.7928350E−07 |
| A8 | 1.8028661E−07 | 5.2177800E−08 | −1.0919051E−08 | −2.8637486E−09 |
| A10 | −1.4067896E−09 | 3.1301232E−09 | −1.8507702E−09 | −1.3899860E−09 |
| A12 | −2.2814880E−11 | −7.3651672E−11 | 1.0563231E−11 | 6.0352072E−12 |
| A14 | 6.1433666E−13 | −4.5160923E−13 | 2.8766649E−13 | 2.0465270E−13 |
| A16 | −3.8662350E−15 | 1.9511796E−14 | −1.3720703E−15 | −3.0795803E−16 |

Example 10

Figure 20:
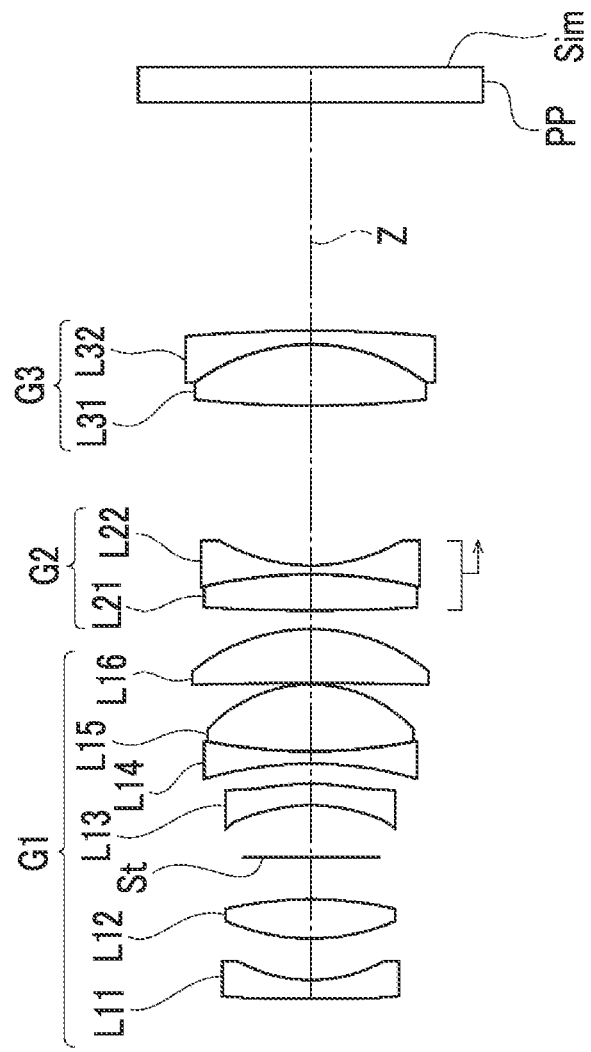
FIG. 20 is a cross-sectional view showing a configuration of an imaging lens of Example 10.
Figure 21:
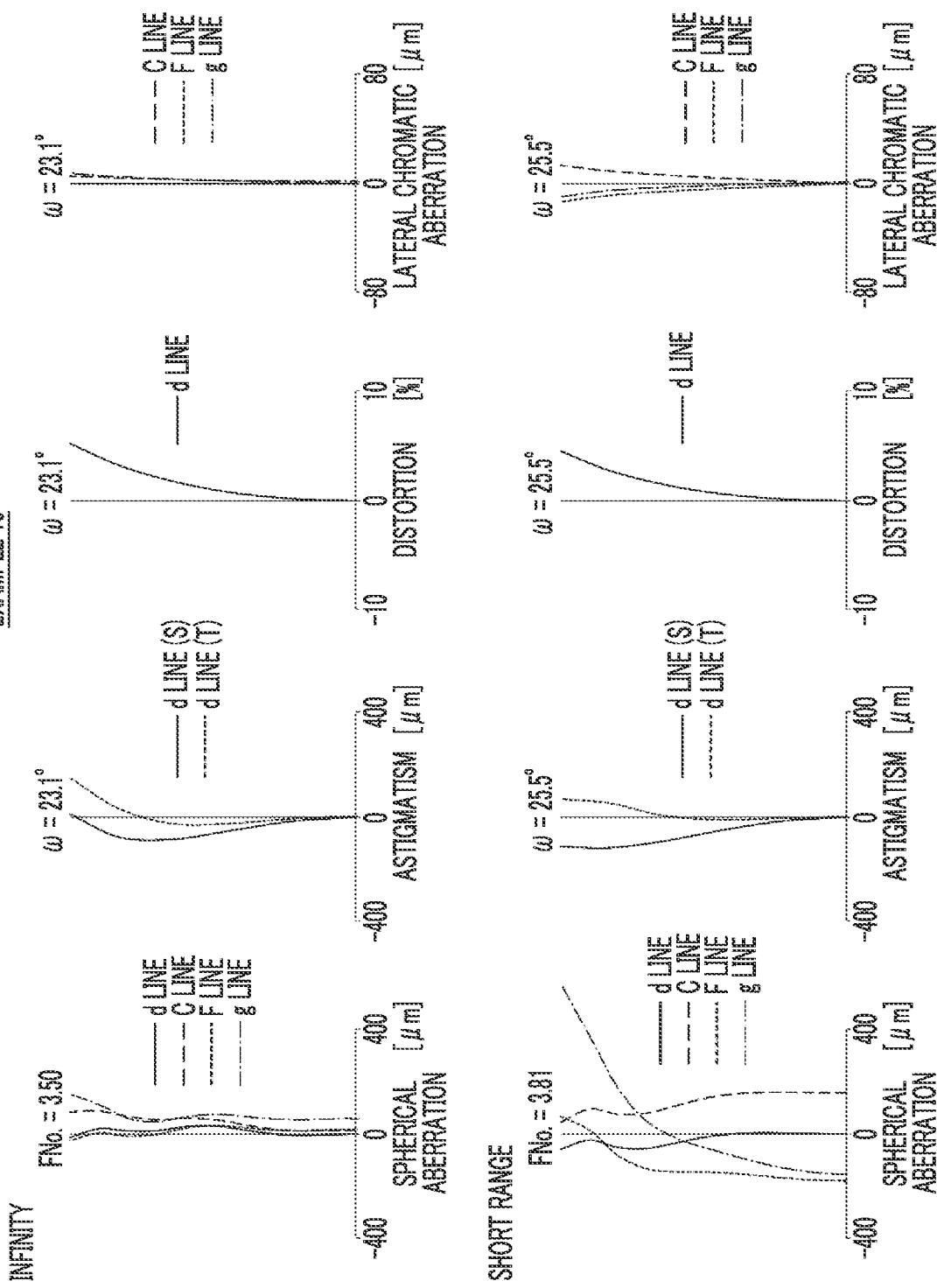
FIG. 21 is a diagram showing aberrations of the imaging lens of Example 10.

FIG. 20 is a cross-sectional view showing a configuration of the imaging lens of Example 10. The imaging lens of Example 10 has the same configuration as the outline of the imaging lens of Example 1 except that the second lens group G2 consists of two lenses L21 and L22. Regarding the imaging lens of Example 10, Table 28 shows basic lens data, Table 29 shows specification and variable surface distances, and Table 30 shows aspheric surface coefficients thereof, and FIG. 21 shows aberration diagrams. FIG. 21 shows aberration diagrams in a state where the object at infinity is in focus in the upper part, and shows aberration diagrams in a state where the short range object is in focus in the lower part.

TABLE 28

Example 10

| Sn | R | D | Nd | vd |
|---|---|---|---|---|
| *1 | −111.2778 | 1.50 | 1.85135 | 40.10 |
| *2 | 15.0001 | 3.32 | | |
| 3 | 17.8218 | 3.16 | 1.64769 | 33.79 |
| 4 | −32.0694 | 3.40 | | |
| 5(St) | ∞ | 4.20 | | |
| *6 | −13.0001 | 1.73 | 1.95150 | 29.83 |
| *7 | −17.6666 | 1.61 | | |
| 8 | −31.8980 | 1.00 | 1.86966 | 20.02 |
| 9 | 45.5630 | 5.39 | 1.49700 | 81.54 |
| 10 | −11.7704 | 0.10 | | |
| 11 | −384.0512 | 4.37 | 1.81600 | 46.62 |
| 12 | −15.5910 | DD[12] | | |
| 13 | 161.2653 | 2.91 | 1.98613 | 16.48 |
| 14 | −39.4883 | 0.71 | 1.74400 | 44.79 |
| 15 | 15.0000 | DD[15] | | |
| 16 | 89.7975 | 4.95 | 1.58913 | 61.13 |
| 17 | −16.2054 | 1.10 | 2.00069 | 25.46 |
| 18 | −114.7094 | 18.39 | | |
| 19 | ∞ | 2.85 | 1.51680 | 64.20 |
| 20 | ∞ | 0.00 | | |

TABLE 29

Example 10

| | Infinity | Short range |
|---|---|---|
| f | 31.74 | — |
| FNo. | 3.50 | 3.81 |
| 2ω(°) | 46.2 | — |
| DD[12] | 1.50 | 8.09 |
| DD[15] | 12.81 | 6.22 |

TABLE 30

Example 10

| Sn | 1 | 2 | 6 | 7 |
|---|---|---|---|---|
| KA | 1.0000000E+00 | 1.0000000E+00 | 1.0000000E+00 | 1.0000000E+00 |
| A4 | 4.5935826E−04 | 4.6606745E−04 | 3.4710853E−04 | 4.8983577E−04 |
| A6 | −1.4128910E−05 | −1.2208651E−05 | −1.7100394E−06 | 6.3200612E−07 |
| A8 | 2.8218522E−07 | 6.7455835E−08 | −6.8000733E−08 | −5.6743247E−08 |
| A10 | −2.6627837E−09 | 4.9251921E−09 | −2.2797910E−09 | −1.2213018E−09 |
| A12 | −2.3801046E−11 | −1.0524455E−10 | 5.6771050E−11 | 2.6993023E−11 |
| A14 | 7.9328790E−13 | −8.3715968E−13 | −1.1018988E−13 | 6.4314244E−14 |
| A16 | −4.9898881E−15 | 2.9261964E−14 | −5.4663709E−15 | −2.2385052E−15 |

Example 11

Figure 22:
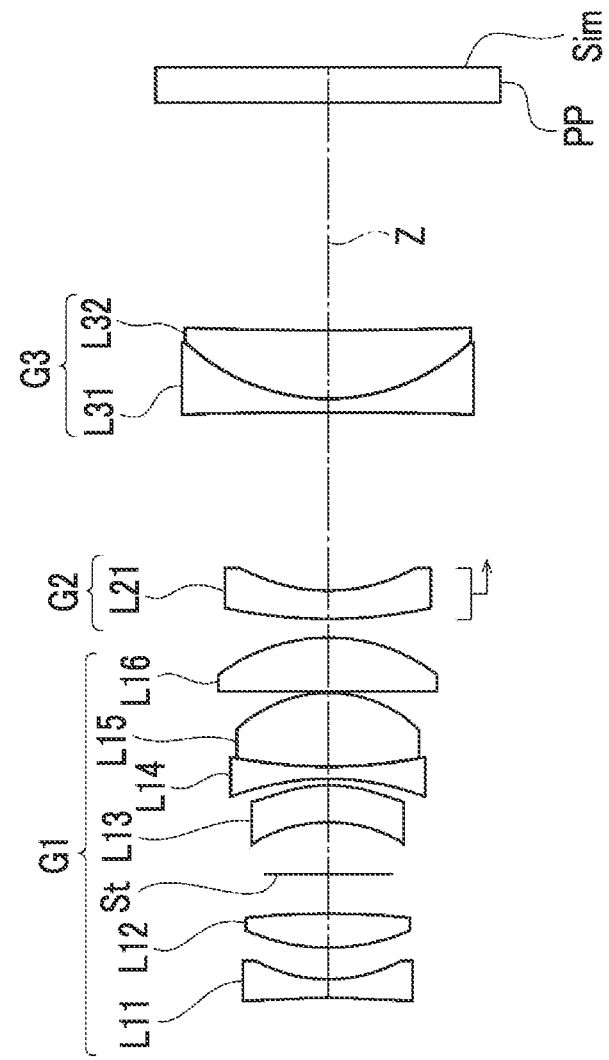
FIG. 22 is a cross-sectional view showing a configuration of an imaging lens of Example 11.
Figure 23:
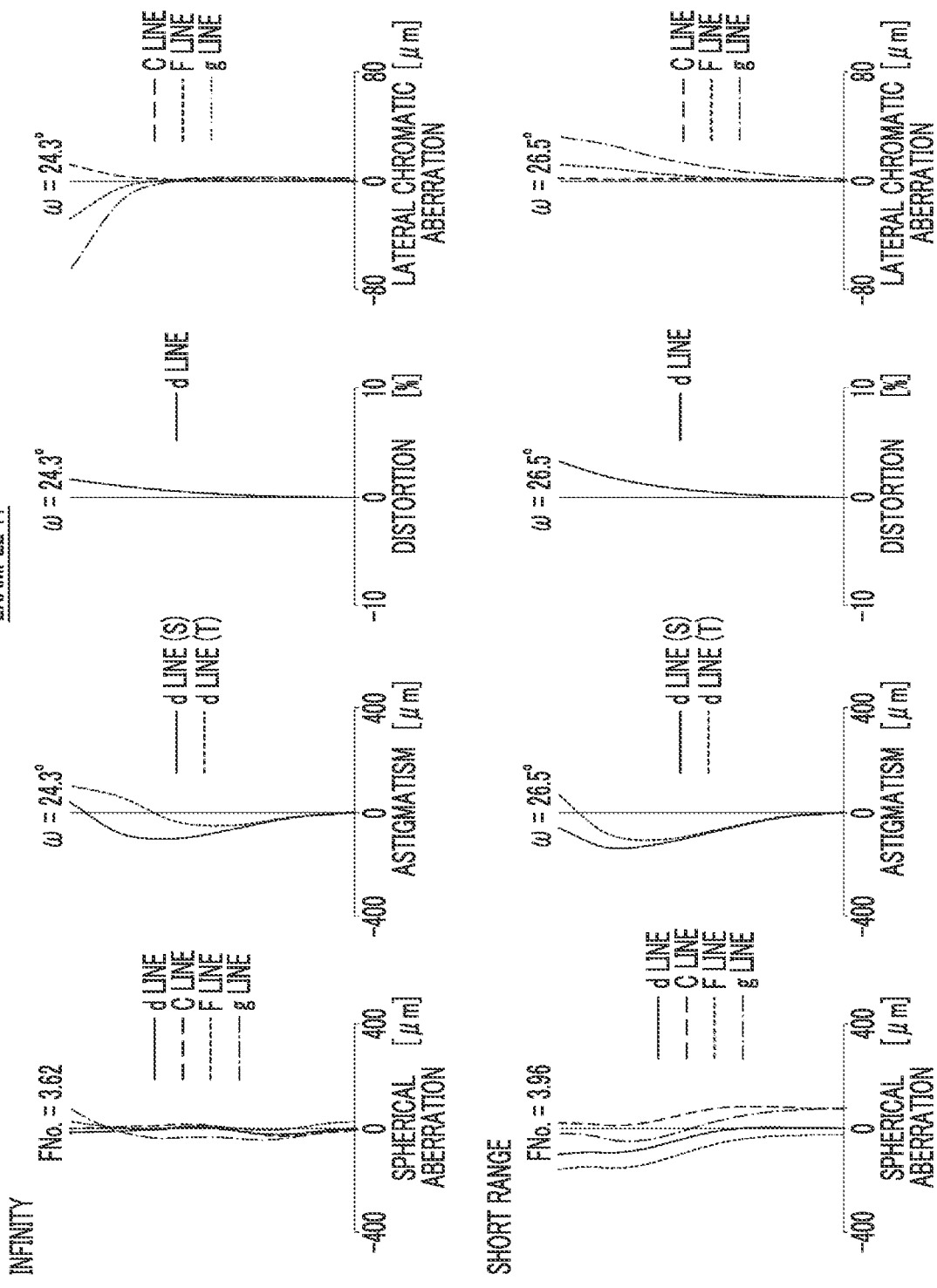
FIG. 23 is a diagram showing aberrations of the imaging lens of Example 11.

FIG. 22 is a cross-sectional view showing a configuration of the imaging lens of Example 11. The imaging lens of Example 11 has the same configuration as the outline of the imaging lens of Example 1 except that the third lens group G3 has a positive refractive power. Regarding the imaging lens of Example 11, Table 31 shows basic lens data, Table 32 shows specification and variable surface distances, and Table 33 shows aspheric surface coefficients thereof, and FIG. 23 shows aberration diagrams. FIG. 23 shows aberration diagrams in a state where the object at infinity is in focus in the upper part, and shows aberration diagrams in a state where the short range object is in focus in the lower part.

TABLE 31

Example 11

| Sn | R | D | Nd | νd |
|---|---|---|---|---|
| *1 | −29.0022 | 1.50 | 1.72903 | 54.04 |
| *2 | 16.6738 | 2.53 | | |
| 3 | 17.0996 | 2.75 | 1.86966 | 20.02 |
| 4 | −66.3155 | 3.17 | | |
| 5(St) | ∞ | 4.20 | | |
| *6 | −13.1791 | 3.00 | 1.85135 | 40.10 |
| *7 | −11.8426 | 0.51 | | |
| 8 | −22.7961 | 1.00 | 2.00272 | 19.32 |
| 9 | 42.9660 | 5.95 | 1.41390 | 100.82 |
| 10 | −11.0000 | 0.10 | | |
| 11 | 1204.0439 | 4.36 | 1.75500 | 52.32 |
| 12 | −14.9999 | DD[12] | | |
| 13 | 40.3340 | 2.28 | 2.05090 | 26.94 |
| 14 | 14.9999 | DD[14] | | |
| 15 | −496.9044 | 1.11 | 1.85150 | 40.78 |
| 16 | 17.4486 | 5.53 | 1.95906 | 17.47 |
| 17 | 337.4772 | 18.39 | | |
| 18 | ∞ | 2.85 | 1.51680 | 64.20 |
| 19 | ∞ | 0.00 | | |

TABLE 32

Example 11

| | Infinity | Short range |
|---|---|---|
| f | 30.90 | — |
| FNo. | 3.62 | 3.96 |
| 2ω(°) | 48.6 | — |
| DD[12] | 1.50 | 8.10 |
| DD[14] | 14.32 | 7.72 |

TABLE 33

Example 11

| Sn | 1 | 2 | 6 | 7 |
|---|---|---|---|---|
| KA | 1.0000000E+00 | 1.0000000E+00 | 1.0000000E+00 | 1.0000000E+00 |
| A4 | 7.9009414E−04 | 7.5148841E−04 | −1.4016310E−04 | 1.7845923E−04 |
| A6 | −3.3215940E−05 | −2.7142729E−05 | −3.1693013E−06 | −1.6139836E−07 |
| A8 | 1.2725990E−06 | 6.2505233E−07 | 4.1832590E−07 | 1.5215469E−07 |
| A10 | −3.8569418E−08 | −2.4967885E−09 | −1.5131492E−08 | −2.2012549E−09 |
| A12 | 7.7202591E−10 | −4.1177600E−10 | 9.6502373E−11 | −7.1359385E−11 |
| A14 | −8.7011268E−12 | 1.2470919E−11 | 8.0924527E−12 | 3.3621663E−12 |
| A16 | 4.1291232E−14 | −1.1709218E−13 | −1.6545061E−13 | −3.9260980E−14 |

Table 34 shows the corresponding values of Conditional Expressions (1) to (14) of the imaging lenses of Examples 1 to 11. In Examples 1 to 11, the d line is set as the reference wavelength. Table 34 shows the values based on the d line.

TABLE 34

| Expression number | | Example 1 | Example 2 | Example 3 | Example 4 | Example 5 | Example 6 |
|---|---|---|---|---|---|---|---|
| (1) | f/f3 | −0.166 | −0.200 | 0.151 | 0.076 | 0.044 | −0.096 |
| (2) | N1 | 1.88202 | 1.85135 | 1.69350 | 1.80139 | 1.95150 | 1.88202 |
| (3) | N2 | 1.92286 | 1.95906 | 1.92286 | 1.89286 | 1.92286 | 1.85451 |
| (4) | ν1n − ν1p | 18.3 | 22.6 | 32.3 | 25.1 | 8.9 | 12.1 |
| (5) | |f/f2| | 1.126 | 1.032 | 1.266 | 1.227 | 1.300 | 1.358 |
| (6) | ν3n − ν3p | 9.9 | 19.9 | 29.6 | 18.0 | −23.7 | −23.6 |
| (7) | ν2n − ν2p | − | − | − | − | 18.2 | 15.3 |
| (8) | ν3p − ν3n | −9.9 | −19.9 | −29.6 | −18.0 | 23.7 | 23.6 |
| (9) | ν1cp | 81.5 | 81.5 | 81.5 | 81.5 | 81.5 | 81.5 |
| (10) | ν1cp − ν1cn | 64.1 | 64.5 | 65.1 | 64.5 | 62.6 | 60.7 |
| (11) | (R2r + R2f)/(R2r − R2f) | −2.54 | −2.69 | −2.19 | −2.15 | −1.34 | −1.51 |
| (12) | (R3r + R3f)/(R3r−R3f) | −4.81 | −2.61 | 8.64 | −2.66 | 0.43 | −0.61 |
| (13) | $(1 − \beta2^2) \times \beta3^2$ | −5.50 | −5.24 | −5.19 | −4.91 | −5.73 | −6.11 |
| (14) | dH/f1 | 0.522 | 0.564 | 0.378 | 0.383 | 0.563 | 0.544 |

TABLE 34-continued

| Expression number | | Example 7 | Example 8 | Example 9 | Example 10 | Example 11 |
|---|---|---|---|---|---|---|
| (1) | f/f3 | −0.136 | −0.196 | −0.126 | −0.307 | 0.051 |
| (2) | N1 | 1.69350 | 1.85135 | 1.88202 | 1.85135 | 1.72903 |
| (3) | N2 | 1.89286 | 1.95906 | 1.76182 | 1.64769 | 1.86966 |
| (4) | ν1n − ν1p | 32.8 | 22.6 | 10.7 | 6.3 | 34.0 |
| (5) | \|f/f2\| | 1.050 | 1.031 | 1.149 | 1.165 | 1.297 |
| (6) | ν3n − ν3p | 9.9 | 19.9 | — | −35.7 | 23.3 |
| (7) | ν2n − ν2p | — | — | 15.8 | 28.3 | — |
| (8) | ν3p − ν3n | −9.9 | −19.9 | — | 35.7 | −23.3 |
| (9) | ν1cp | 94.7 | 81.5 | 94.7 | 81.5 | 100.8 |
| (10) | ν1cp − ν1cn | 77.6 | 64.5 | 73.8 | 61.5 | 81.5 |
| (11) | (R2r + R2f)/(R2r − R2f) | −2.55 | −2.70 | −2.17 | −1.21 | −2.18 |
| (12) | (R3r + R3f)/(R3r − R3f) | −1.65 | −2.62 | −7.53 | 0.12 | −0.19 |
| (13) | $(1 − β2^2) × β3^2$ | −4.93 | −5.29 | −4.88 | −5.58 | −5.34 |
| (14) | dH/f1 | 0.492 | 0.573 | 0.563 | 0.565 | 0.463 |

The imaging lenses of Examples 1 to 11 are configured to have a small size, and the focus group consists of one or two lenses. As a result, there is an advantage in achieving an increase in speed of focusing. The imaging lenses of Examples 1 to 11 maintain high optical performance by satisfactorily correcting various aberrations not only in the state where the object at infinity is in focus but also in the state where the short range object is in focus.

Figure 24:
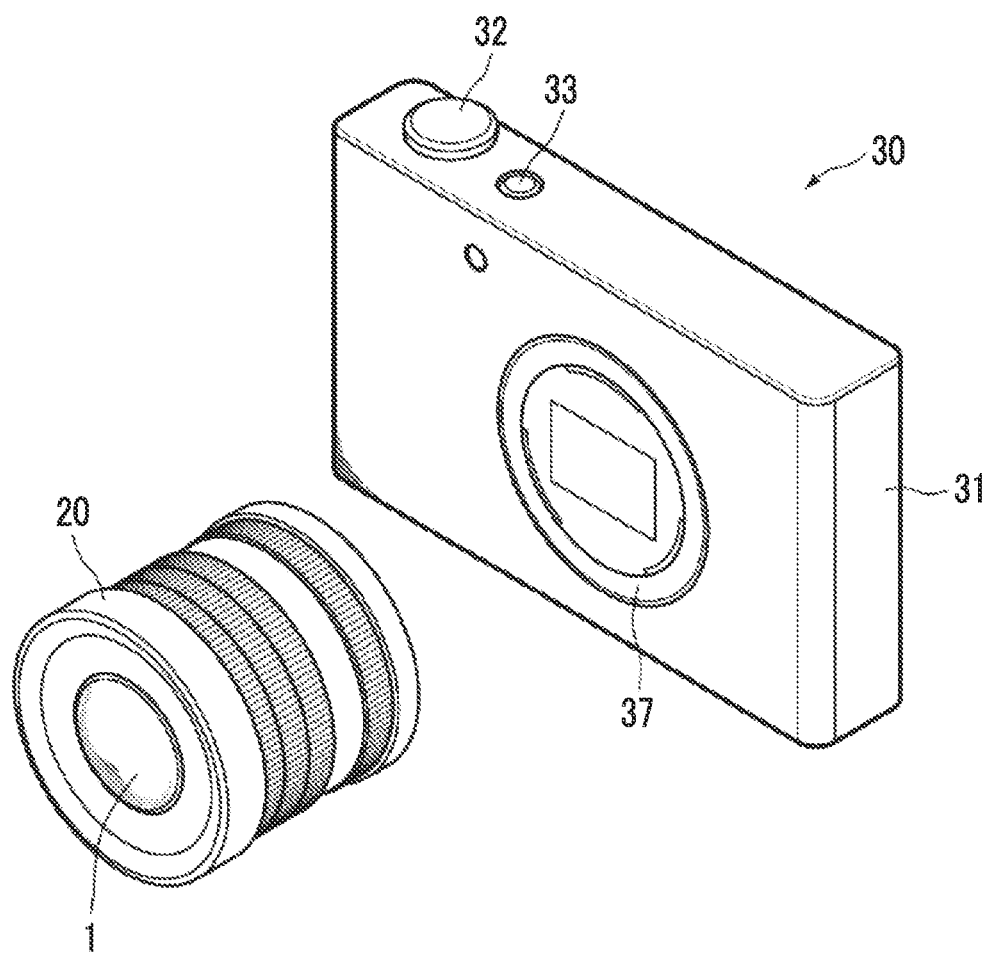
FIG. 24 is a perspective view of the front side of an imaging apparatus according to an embodiment of the present disclosure.
Figure 25:
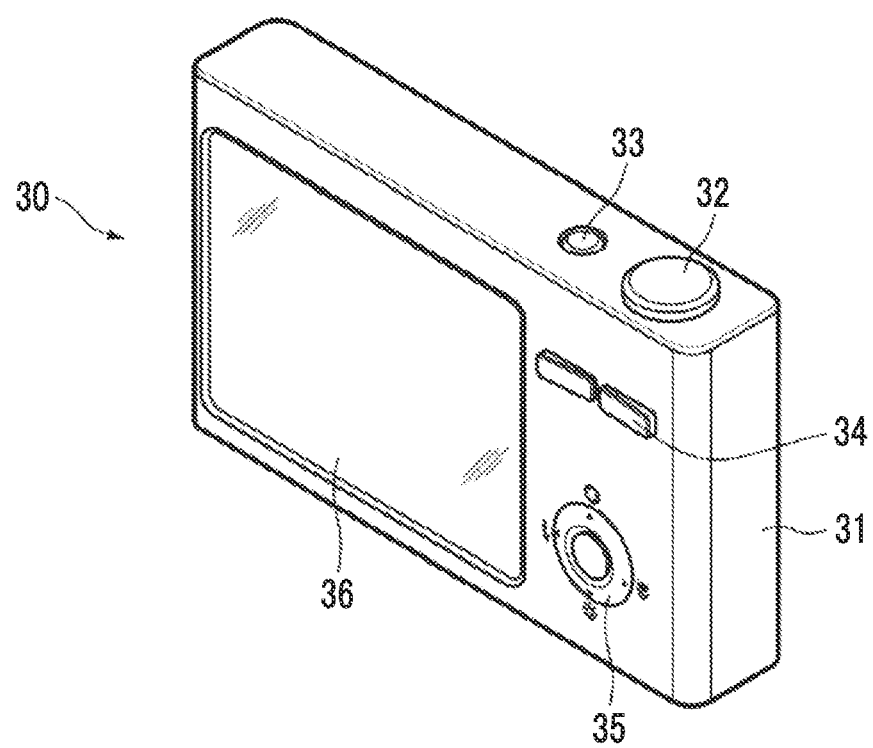
FIG. 25 is a perspective view of the rear side of an imaging apparatus according to an embodiment of the present disclosure.

Next, an imaging apparatus according to an embodiment of the present disclosure will be described. FIGS. 24 and 25 are external views of a camera 30 which is the imaging apparatus according to the embodiment of the present disclosure. FIG. 24 is a perspective view of the camera 30 viewed from the front side, and FIG. 25 is a perspective view of the camera 30 viewed from the rear side. The camera 30 is a so-called mirrorless type digital camera, and the interchangeable lens 20 can be detachably attached thereto. The interchangeable lens 20 is configured to include the imaging lens 1, which is housed in a lens barrel, according to an embodiment of the present disclosure.

The camera 30 comprises a camera body 31, and a shutter button 32 and a power button 33 are provided on an upper surface of the camera body 31. Further, an operation section 34, an operation section 35, and a display section 36 are provided on a rear surface of the camera body 31. The display section 36 is able to display a captured image and an image within an angle of view before imaging.

An imaging aperture, through which light from an imaging target is incident, is provided at the center on the front surface of the camera body 31. A mount 37 is provided at a position corresponding to the imaging aperture. The interchangeable lens 20 is mounted on the camera body 31 with the mount 37 interposed therebetween.

In the camera body 31, there are provided an imaging element, a signal processing circuit, a storage medium, and the like. The imaging element such as a charge coupled device (CCD) or a complementary metal oxide semiconductor (CMOS) outputs a captured image signal based on a subject image which is formed through the interchangeable lens 20. The signal processing circuit generates an image through processing of the captured image signal which is output from the imaging element. The storage medium stores the generated image. The camera 30 is able to capture a still image or a video by pressing the shutter button 32, and is able to store image data, which is obtained through imaging, in the storage medium.

The technology of the present disclosure has been hitherto described through embodiments and examples, but the technology of the present disclosure is not limited to the above-mentioned embodiments and examples, and may be modified into various forms. For example, values such as the radius of curvature, the surface distance, the refractive index, the Abbe number, and the aspheric surface coefficient of each lens are not limited to the values shown in the examples, and different values may be used therefor.

Further, the imaging apparatus according to the embodiment of the present disclosure is not limited to the above example, and may be modified into various forms such as a camera other than the mirrorless type, a film camera, and a video camera.

What is claimed is:

1. An imaging lens consisting of, in order from an object side to an image side: a first lens group that has a positive refractive power; a second lens group that has a negative refractive power; and a third lens group,
    wherein during focusing, the first lens group and the third lens group remains stationary with respect to an image plane, and the second lens group moves,
    the first lens group includes a single lens that has a positive refractive power and that has a surface convex toward the image side at a position closest to the image side,
    the second lens group consists of one negative lens,
    the third lens group consists of, in order from the object side to the image side, one positive lens and one negative lens,
    assuming that
        a focal length of the imaging lens in a state where an object at infinity is in focus is f, and
        a focal length of the third lens group is f3,
        Conditional Expression (1) is satisfied, which is represented by $$-0.5 < f/f3 < 0.38 \qquad (1),$$

assuming that a focal length of the second lens group is f2, Conditional Expression (5) is satisfied, which is represented by $$0.5 < |f/f2| < 2 \qquad (5),$$

a lens surface closest to the object side in the second lens group is a convex surface,
a lens surface closest to the image side in the second lens group is a concave surface, and assuming that a radius of curvature of a lens surface closest to the object side in the third lens group is R3f, and a radius of curvature of a lens surface closest to the image side in the third lens group is R3r, Conditional Expression (12-1) is satisfied, which is represented by $$-6<(R3r+R3f)/(R3r-R3f)\leq0.43 \qquad (12\text{-}1).$$

2. The imaging lens according to claim 1, wherein the first lens group includes a stop.

3. The imaging lens according to claim 1, wherein Conditional Expression (1-1) is satisfied, which is represented by $$-0.4<f/f3<0.3 \qquad (1\text{-}1).$$

4. An imaging apparatus comprising the imaging lens according to claim 1.

5. An imaging lens consisting of, in order from an object side to an image side: a first lens group that has a positive refractive power; a second lens group that has a negative refractive power; and a third lens group, wherein during focusing, the first lens group and the third lens group remains stationary with respect to an image plane, and the second lens group moves, the first lens group includes a single lens that has a positive refractive power and that has a surface convex toward the image side at a position closest to the image side, the second lens group consists of one negative lens, the third lens group consists of, in order from the object side to the image side, one positive lens and one negative lens, assuming that a focal length of the imaging lens in a state where an object at infinity is in focus is f, and a focal length of the third lens group is f3, Conditional Expression (1-1) is satisfied, which is represented by $$-0.4<f/f3<0.3 \qquad (1\text{-}1),$$

assuming that an Abbe number of the positive lens of the third lens group based on a d line is ν3p, and an Abbe number of the negative lens of the third lens group based on the d line is ν3n, Conditional Expression (6) is satisfied, which is represented by $$5<\nu3n-\nu3p<38 \qquad (6),$$

a lens surface closest to the object side in the second lens group is a convex surface, a lens surface closest to the image side in the second lens group is a concave surface, and assuming that a radius of curvature of a lens surface closest to the object side in the third lens group is R3f, and a radius of curvature of a lens surface closest to the image side in the third lens group is R3r, Conditional Expression (12-1) is satisfied, which is represented by $$-6<(R3r+R3f)/(R3r-R3f)<1 \qquad (12\text{-}1).$$

6. The imaging lens according to claim 5, wherein the first lens group includes a stop.

7. An imaging apparatus comprising the imaging lens according to claim 5.

8. An imaging lens consisting of, in order from an object side to an image side: a first lens group that has a positive refractive power; a second lens group that has a negative refractive power; and a third lens group, wherein during focusing, the first lens group and the third lens group remains stationary with respect to an image plane, and the second lens group moves, the first lens group includes a single lens that has a positive refractive power and that has a surface convex toward the image side at a position closest to the image side, the second lens group consists of one negative lens, the third lens group consists of, in order from the object side to the image side, one positive lens and one negative lens, assuming that a focal length of the imaging lens in a state where an object at infinity is in focus is f, and a focal length of the third lens group is f3, Conditional Expression (1-1) is satisfied, which is represented by $$-0.4<f/f3<0.3 \qquad (1\text{-}1),$$

the first lens group includes an aperture stop and at least one group of cemented lenses which is disposed on the image side of the aperture stop and which includes a negative lens and a positive lens, and assuming that an Abbe number of the positive lens of the cemented lenses of the first lens group based on a d line is ν1cp, the imaging lens includes at least one positive lens satisfying Conditional Expression (9), which is represented by $$70<\nu1cp<110 \qquad (9), \text{ and}$$

assuming that a radius of curvature of a lens surface closest to the object side in the third lens group is R3f, and a radius of curvature of a lens surface closest to the image side in the third lens group is R3r, Conditional Expression (12-1) is satisfied, which is represented by $$-6<(R3r+R3f)/(R3r-R3f)<1 \qquad (12\text{-}1).$$

9. The imaging lens according to claim 8, wherein assuming that Abbe numbers of the positive lenses and the negative lenses of the cemented lenses of the first lens group, which are cemented to each other, based on the d line are ν1cp and ν1cn, the imaging lens includes at least one group of cemented lenses satisfying Conditional Expression (10), which is represented by $$50<\nu1cp-\nu1cn<85 \qquad (10).$$

10. The imaging lens according to claim 8, wherein the first lens group includes a stop.

11. An imaging apparatus comprising the imaging lens according to claim 8.

* * * * *